(12) United States Patent
Maeda et al.

(10) Patent No.: US 7,176,994 B2
(45) Date of Patent: Feb. 13, 2007

(54) LIQUID CRYSTAL DISPLAY PANEL HAVING REFLECTION ELECTRODES IMPROVED IN SMOOTH SURFACE MORPHOLOGY AND PROCESS FOR FABRICATION THEREOF

(75) Inventors: Akitoshi Maeda, Tokyo (JP); Atsushi Yamamoto, Akita (JP); Tomohide Shindoh, Akita (JP)

(73) Assignee: NEC LCD Technologies, Ltd (JP)

( * ) Notice: Subject to any disclaimer, the term of this patent is extended or adjusted under 35 U.S.C. 154(b) by 0 days.

(21) Appl. No.: 10/106,378

(22) Filed: Mar. 27, 2002

(65) Prior Publication Data

US 2002/0140887 A1    Oct. 3, 2002

(30) Foreign Application Priority Data

Mar. 29, 2001   (JP) .............................. 2001-095824
Feb. 7, 2002    (JP) .............................. 2002-030472

(51) Int. Cl.
*G02F 1/1335*  (2006.01)
*G02F 1/1337*  (2006.01)
*G02F 1/1343*  (2006.01)

(52) U.S. Cl. ...................................... 349/113; 349/123
(58) Field of Classification Search ................ 349/113, 349/123
See application file for complete search history.

(56) References Cited

U.S. PATENT DOCUMENTS

| | | | | |
|---|---|---|---|---|
| 4,648,691 A | * | 3/1987 | Oguchi et al. ............... | 349/162 |
| 5,098,975 A | * | 3/1992 | Omelis et al. ............... | 526/312 |
| 6,094,252 A | * | 7/2000 | Itoh et al. .................... | 349/180 |
| 6,103,322 A | * | 8/2000 | Gibbons et al. ............ | 428/1.25 |
| 6,108,064 A | * | 8/2000 | Minoura et al. ............ | 349/130 |
| 6,320,138 B1 | * | 11/2001 | Kamiya et al. ............. | 174/261 |
| 6,373,541 B1 | * | 4/2002 | Sekime et al. ............... | 349/117 |
| 6,441,873 B2 | * | 8/2002 | Young .......................... | 349/43 |
| 6,577,356 B2 | * | 6/2003 | Onishi et al. ................. | 349/32 |

FOREIGN PATENT DOCUMENTS

CN    1117594    2/1996

(Continued)

OTHER PUBLICATIONS

Japanese Office Action issued Jan. 27, 2004 (w/ English translation of relevant portions).

(Continued)

*Primary Examiner*—Andrew Schechter
*Assistant Examiner*—David Y. Chung
(74) *Attorney, Agent, or Firm*—Dickstein, Shapiro, LLP.

(57) ABSTRACT

A liquid crystal display panel of the type having reflection electrodes tends to have an image-forming plane undesirably yellowed due to the wavelength dependency of transparency observed in an orientation layer on the reflection electrodes; aluminum-neodymium alloy, which has neodymium content between 5 weight % to 10 weight %, is deposited on an inter-layered insulating layer at the substrate temperature equal to or less than 170 degrees in centigrade for the reflection electrodes so that the surface morphology is represented by average pitches equal to or less than 1 micron; even though the orientation layer has the wavelength dependency of transparency, the reflection electrodes make the optical path in the orientation layer equalized so that the image-forming plane is not yellowed.

2 Claims, 20 Drawing Sheets

FOREIGN PATENT DOCUMENTS

| | | |
|---|---|---|
| CN | 1159230 A | 9/1997 |
| JP | 62-165628 | 7/1987 |
| JP | 5-80327 | 4/1993 |
| JP | 8-184846 | 7/1996 |
| JP | 10-48669 | 2/1998 |
| JP | 10-148846 | 6/1998 |
| JP | 11-31823 | 2/1999 |
| JP | 11-326953 | 11/1999 |
| JP | 2000-10124 | 1/2000 |
| JP | 2000-98361 | 4/2000 |
| JP | 2000-105367 | 4/2000 |
| JP | 2000-111906 | 4/2000 |
| JP | 2000-147493 | 5/2000 |
| JP | 2000-162637 | 6/2000 |
| JP | 2000-193964 | 7/2000 |
| JP | 2000-258787 | 9/2000 |
| JP | 2000-336447 | 12/2000 |
| JP | 2001-350142 | 12/2001 |

OTHER PUBLICATIONS

Japanese Office Action issued Jan. 20, 2004 (w/ English translation of relevant portions).
Japanese Office Action issued Jun. 23, 2004 (w/ English translation of relevant portions).
Chinese Office Action issued Apr. 1, 2005.
Japanese Office Action (w/English translation of relevant portions).

* cited by examiner

| NEODYMIUM CONTENT (WT%) | 0.1 | 0.5 | 2 | 5 | 10 | 20 |
|---|---|---|---|---|---|---|
| HILLOCKS (230°C, 1h) | × | ○ | ○ | ○ | ○ | ○ |
| REFLECTIVITY | ○ | ○ | ○ | ○ | △ | × |

| SUBSTRATE TEMP. (°C) | 20 | 70 | 100 | 150 | 170 | 200 |
|---|---|---|---|---|---|---|
| COLOR | ○ | ○ | ○ | ○ | ○ | × |
| REFLECTIVITY (ON ORGANIC COMPOUND) | △ | ○ | ○ | ○ | △ | △ |
| CONTACT RESISTANCE | × | ○ | ○ | ○ | ○ | ○ |

LIQUID CRYSTAL DISPLAY PANEL HAVING REFLECTION ELECTRODES IMPROVED IN SMOOTH SURFACE MORPHOLOGY AND PROCESS FOR FABRICATION THEREOF

FIELD OF THE INVENTION

This invention relates to a liquid crystal display panel and, more particularly, to a liquid crystal display panel of the type having a reflection electrode, which is hereinbelow referred to as "reflective liquid crystal panel, or a reflective-transparent liquid crystal display panel and a process for fabrication thereof.

DESCRIPTION OF THE RELATED ART

FIG. 1 shows a typical example of the reflective liquid crystal display panel disclosed in Japanese Patent Application laid-open No. 2000-258787. The prior art reflective liquid crystal display panel is broken down into a pair of substrate structures S1/S2, liquid crystal LC1, sealing layer (not shown) and spacers (not shown). The substrate structures S1 and S2 are spaced from each other by means of the spacers, and form an inner space together with the sealing layer. The inner space is filled with the liquid crystal LC1. In this instance, the twisted nematic liquid crystal is sealed in the inner space between the substrate structures S1 and S2. Ellipses stand for liquid crystal molecules, and are labeled with reference numeral 121.

The substrate structure S1 is fabricated on an insulating substrate 110. The insulating substrate 110 is formed of quartz or no-alkali glass. An array of switching transistors is fabricated on the insulating substrate 110. The switching transistors are thin film transistors, and only one thin film transistor is shown in FIG. 1. Other thin film transistors are fabricated concurrently with the thin film transistor. The thin film transistor is fabricated as follows. First, a gate electrode 111 of refractory metal such as chromium (Cr) or molybdenum (Mo) is formed on the insulating substrate 110. The gate electrode 111 is covered with a gate insulating layer 112, and an active layer 113 is patterned on the gate insulating layer 112. The active layer 113 is formed of polysilicon. An insulating stopper 114 is formed on the active layer 113. A part of the active layer 113 over the gate electrode 111 serves as a channel region 113c of the thin film transistor. Using the insulating stopper 114 as an ion-implantation mask, dopant impurity is ion implanted into the active layer 113, and forms a drain region 113d and a source region 113s on both sides of the channel region 113c.

On the entire surface of the resultant structure are successively deposited silicon dioxide ($SiO_2$), silicon nitride ($SiN_x$) and silicon dioxide ($SiO_2$) which form in combination an inter-layered insulating layer 115. A contact hole is formed in the inter-layered insulating layer 115, and reaches the drain region 113d. A metal layer such as an aluminum layer is patterned into a drain electrode 116. The drain electrode 116 penetrates through the contact hole formed in the inter-layered insulating layer 115, and is held in contact with the drain region 113d.

Organic compound resin is, by way of example, deposited over the entire surface of the resultant structure, and forms a planarization layer 117. A contact hole is formed in the planarization layer 117 and the inter-layered insulating layer 115. The source region 113s is exposed to the contact hole. A reflection electrode 119 is patterned on the planarization layer 117. The reflection electrode 119 penetrates through the contact hole, and is held in contact with the source region 113s. Thus, the reflection electrode 119 further serves as a source electrode. The reflection electrode 119 and the exposed surface of the planarization layer 117 are covered with an orientation layer 120, which is formed of organic compound resin such as polyimide.

The other substrate structure S2 is opposed to the above-described substrate structure S1, and is also fabricated on an insulating substrate 130. The insulating substrate 130 has two major surfaces. One of the major surfaces is opposed to the substrate structure S1, and is hereinbelow referred to as "inner surface". The other major surface is reverse to the inner surface, and is hereinbelow referred to as "outer surface".

Color filters 131 and a black matrix 132 are patterned on the inner surface of the insulating substrate 130. The color filters 131 are selectively in the primary three colors, i.e., red, green G and blue B, and are aligned with the reflection electrodes 119, respectively. The black matrix 132 is not transparent, and is aligned with the thin film transistors. The color filters 131 and the black matrix 132 are covered with a protective layer 133 of synthetic resin, and the protective layer is covered with a counter electrode 134. The counter electrode 134 is laminated with an orientation layer 135. On the other hand, a phase difference plate 143 is formed on the outer surface of the insulating substrate 130, and is covered with a polarizing plate 144.

In the above-described prior art reflective liquid crystal display panel, the reflection electrodes 119 are formed of aluminum-neodymium alloy, i.e., Al—Nd alloy. The Japanese Patent Application laid-open teaches that the alloy contains neodymium equal to or greater than 1 weight %. The Japanese Patent Application laid-open insists that the neodymium equal to or greater than 1 weight % is effective against hillocks. The Japanese Patent Application laid-open further insists that the aluminum-neodymium alloy, which was grown at the substrate temperature of the order of 200 degrees in centigrade, achieves reflectivity as high as an aluminum layer grown at room temperature.

Another prior art technology relating to the reflection plate is disclosed in Japanese Patent Application laid-open No. 5-80327.The Japanese Patent Application laid-open teaches a process for forming a diffuse reflection plate. The process starts with preparation of an organic compound layer. A reflection layer of aluminum or platinum is grown on the organic compound layer at 100 degrees to 250 degrees in centigrade. While the reflective substance, i.e., aluminum or platinum is growing on the organic compound layer, wrinkles take place in the organic compound layer due to the difference in thermal expansion coefficient between the organic compound and the reflective substance, and the reflective substance forms grains on the organic compound layer. Thus, the reflection plate is rugged. This results in improvement in irregular reflection property of the reflection plate.

Yet another prior art technology relating to the reflection plate is disclosed in Japanese Patent Application laid-open No. 2000-111906.The Japanese Patent Application laid-open teaches another process for fabricating an electrooptical device with a rough reflection layer. The electrooptical device contains "liquid crystal display panel", and the prior art process includes the following steps. Bumps are firstly formed in a lower layer by using a honing or n etching, and metal is grown over the bumps at 100 degrees to 300 degrees in centigrade at 80–250 angstroms/min. The bumps are transferred from the lower layer to the metal layer. The metal layer serves as a reflection layer. As to the metal, the Japanese Patent Application laid-open say, "The material for the reflection layer is aluminum or arbitrary kind of (metal)." However, the Japanese Patent Application laid-open is silent to concrete examples of "arbitrary kind of (metal)". After the growth of the metal, the reflection plate is treated with heat so as to form miniature bumps on the surface of the reflection plate at average pitches of 1–2 microns. The miniature bumps are of the order of 0.2 micron in depth. The reflection plate is improved in irregular reflection property by virtue of the miniature bumps. However, the Japanese Patent Application laid-open is silent to another purpose.

Japanese Patent Application laid-open No. 2000-111906 further teaches an orientation layer, which makes the liquid crystal molecules uniformly oriented in a certain direction. The Japanese Patent Application laid-open teaches that the orientation layer is formed of "high-molecular organic compound". Two kinds of high-molecular organic compound, i.e., polyimide and polyvinyl alcohol are exemplified in the Japanese Patent Application laid-open. However, the Japanese Patent Application laid-open is silent to a phenomenon in which the image-forming plane is made yellowish, and does not contain any description on a relation between the average pitch and the reflectivity to a certain wavelength light component.

The present inventors investigated the prior art technologies. The inventors fabricated samples of the prior art liquid crystal display panel with the reflection electrodes formed of the aluminum-neodymium alloy as taught in Japanese Patent Application laid-open No. 2000-258787.

Certain samples had the orientation layers 120 different in substance. In those samples, the aluminum-neodymium was grown at the substrate temperature around 200 degrees in centigrade, and, thereafter, the orientation layers 120 were formed over the reflection electrodes 119. The inventors assembled the substrate structures S1/S2 and the other components into the certain samples. The inventors found some samples to have yellowish image-forming planes.

Other samples had the reflection electrodes grown at the substrate temperature of the order of 70 degrees in centigrade and without heat application to the substrate. In detail, the inventors fabricated the thin film transistors on the insulating substrate of each sample, and spread the organic compound over the thin film transistors for forming the inter-layered insulating layer 117. The contact holes for the source regions 113s were formed in the inter-layered insulating layer 117, and the aluminum-neodymium alloy was deposited over the inter-layered insulating layer 117 at certain substrate temperature in the range from room temperature to 70 degrees in centigrade. The aluminum-neodymium alloy was patterned into the reflection electrodes 119. After the formation of the orientation layer 120, the substrate structure S1 was assembled with the other substrate structure S2 so as to complete each sample. The samples were categorized into the reflective liquid crystal display panel and the reflective-transparent liquid crystal display panel. The inventors drove the samples, and found that the image-carrying signal was not completely written into the pixel electrodes. This was because of the fact that the contact resistance between the reflection electrodes 119 and the source regions 113s was too high. Furthermore, in case where the aluminum-neodymium alloy was grown without heat application to the substrate, the temperature of the inter-layered insulating layer 117 was raised due to the heat of condensation in the deposition of the aluminum-neodymium alloy, and out-gassing took place in the organic compound. The gas gave rise to change in quality of the aluminum-neodymium, and made the reflection electrodes 119 cloudy. This resulted in reduction in reflectivity.

The present inventors further fabricated samples of the electrooptical device disclosed in Japanese Patent Application laid-open No. 2000-111906. The samples have the miniature bumps transferred from the lower layer thereto. However, the miniature bumps were not effective against the yellowish image-forming plane.

These problems are encountered in the prior art liquid crystal display panel disclosed in Japanese Patent Application laid-open No. 2000-258787.

SUMMARY OF THE INVENTION

It is therefore an important object of the present invention to provide a liquid crystal display panel, which is free from yellowish image-forming plane in spite of an orientation layer having a transparency to ultraviolet light smaller than a transparency to visible light.

It is also an important object of the present invention to provide a process for fabricating the liquid crystal display panel.

In accordance with one aspect of the present invention, there is provided a liquid crystal display panel comprising a first substrate structure including reflection plates having a surface morphology represented by average pitches equal to or less than 1 micron and an orientation layer formed over the reflection plates and having a first transparency to light components with wavelengths equal to or less than 400 nanometers and a second transparency to visible light components larger than the first transparency, a second substrate structure having an inner surface opposed to the orientation layer, and liquid crystal sealed in a space between the orientation layer and the inner surface and forming plural pixels together with the reflection plates so as to selectively change a transparency of the plural pixels depending upon the strength of local electric fields created in the vicinity of the reflection plates.

In accordance with another aspect of the present invention, there is provided a process for fabricating a liquid crystal display panel, comprising the steps of a) fabricating an intermediate structure of a first substrate structure, b) growing a highly reflective substance over the intermediate structure under the condition that the intermediate structure is heated to a certain temperature equal to or less than 170 degrees in centigrade for forming a highly reflective substance layer, c) patterning the highly reflective substance layer into reflection plates, d) covering an array of reflection plates with an orientation layer having a first transparency to light components with wavelengths equal to or less than 400 nanometers and a second transparency to visible light components larger than the first transparency so as to complete the first substrate structure, e) assembling the first substrate structure with a second substrate structure in such a manner that the orientation layer is opposed to an inner surface of the second substrate structure and f) sealing liquid crystal in a space between the orientation layer and the inner surface.

BRIEF DESCRIPTION OF THE DRAWINGS

The features and advantages of the liquid crystal display panel and the process for fabrication thereof will be more clearly understood from the following description taken in conjunction with the accompanying drawings, in which.

DESCRIPTION OF THE PREFERRED EMBODIMENTS

First Embodiment

Figure 1:
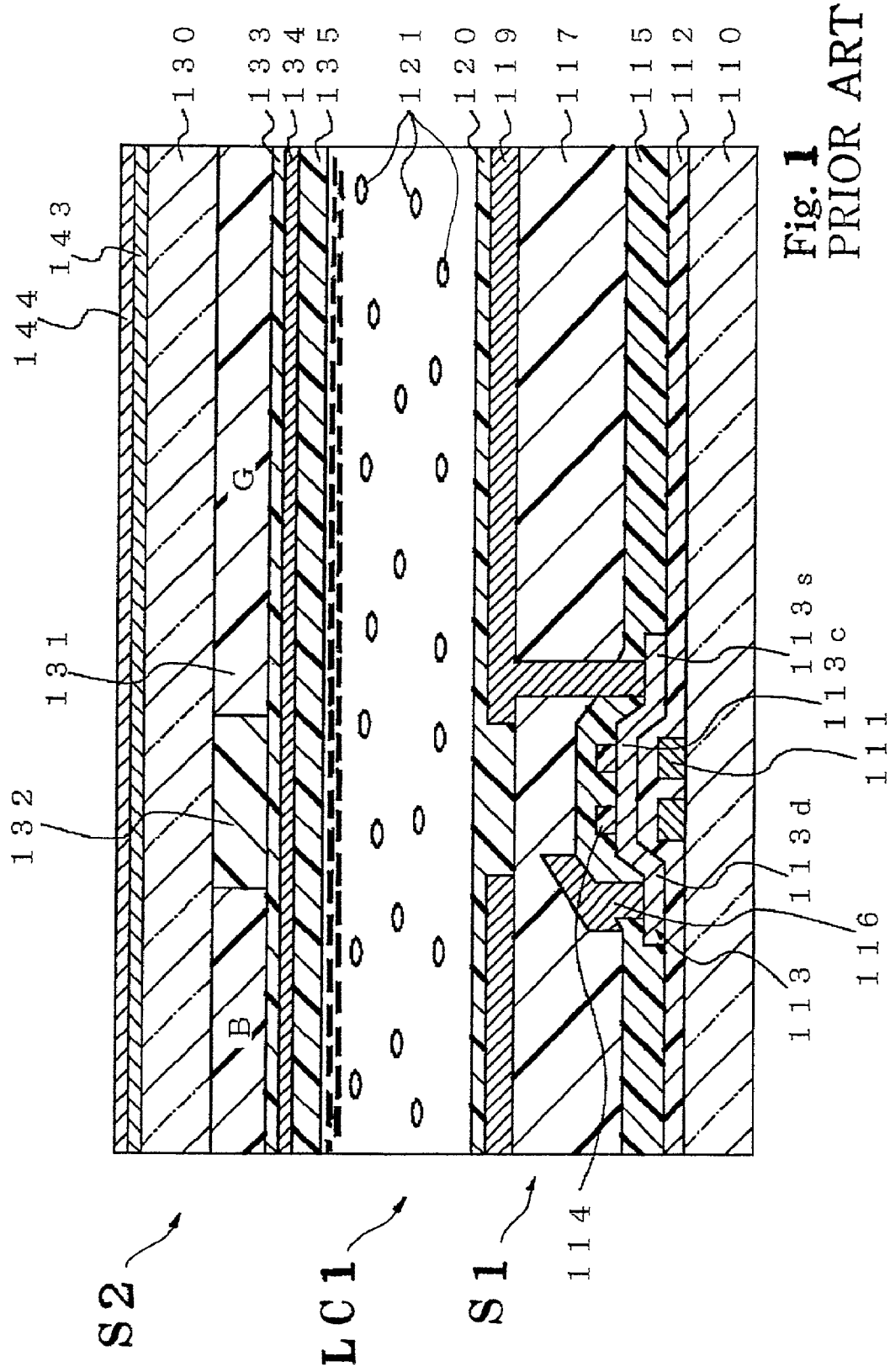
FIG. 1 is a cross sectional view showing the structure of the prior art reflective liquid crystal display panel disclosed in Japanese Patent Application laid-open No. 2000-258787.
Figure 2:
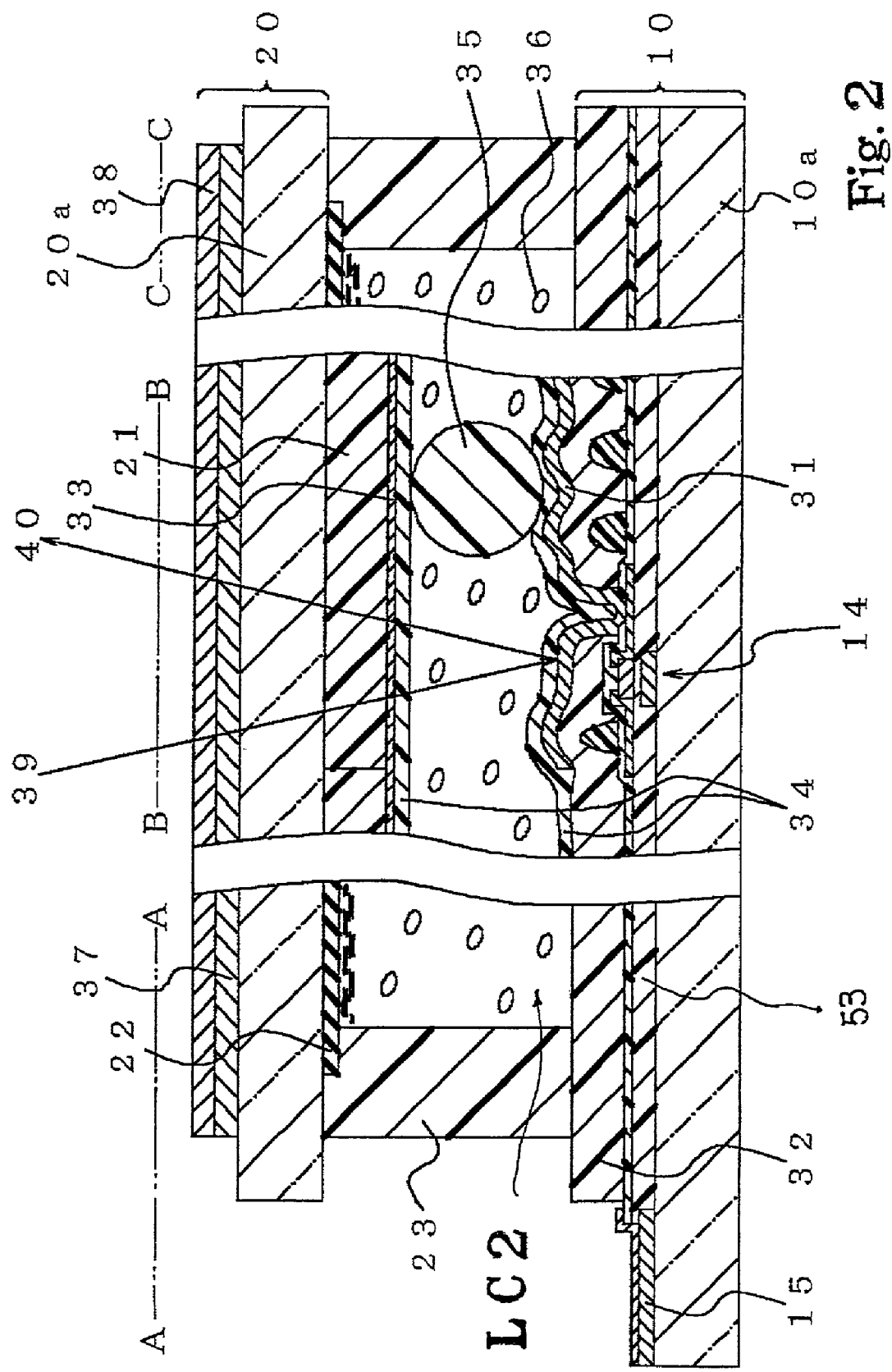
FIG. 2 is a cross sectional view showing the structure of a reflective liquid crystal display panel according to the present invention.

Referring to FIG. 2 of the drawings, a liquid crystal display panel embodying the present invention preferably includes a pair of substrate structures 10/20, liquid crystal LC2, a sealing layer 23 and spherical spacers 35. The substrate structures 10 and 20 are opposed to each other, and the sealing layer 23 and the spherical spacers 35 keep the substrate structures 10 and 20 spaced from each other. In detail, the sealing layer 23 extends along the peripheries of the substrate structures 10/20, and the spherical spacers 35 are scattered inside of the sealing layer 23. The sealing layer 23 and the spherical spacers 35 are sandwiched between the substrate structures 10 and 20, and the liquid crystal LC2 fills the space defined by the substrate structures 10/20 and the sealing layer 23. Ellipses stand for the liquid crystal molecules, and are labeled with reference numeral 36.

Figure 3:
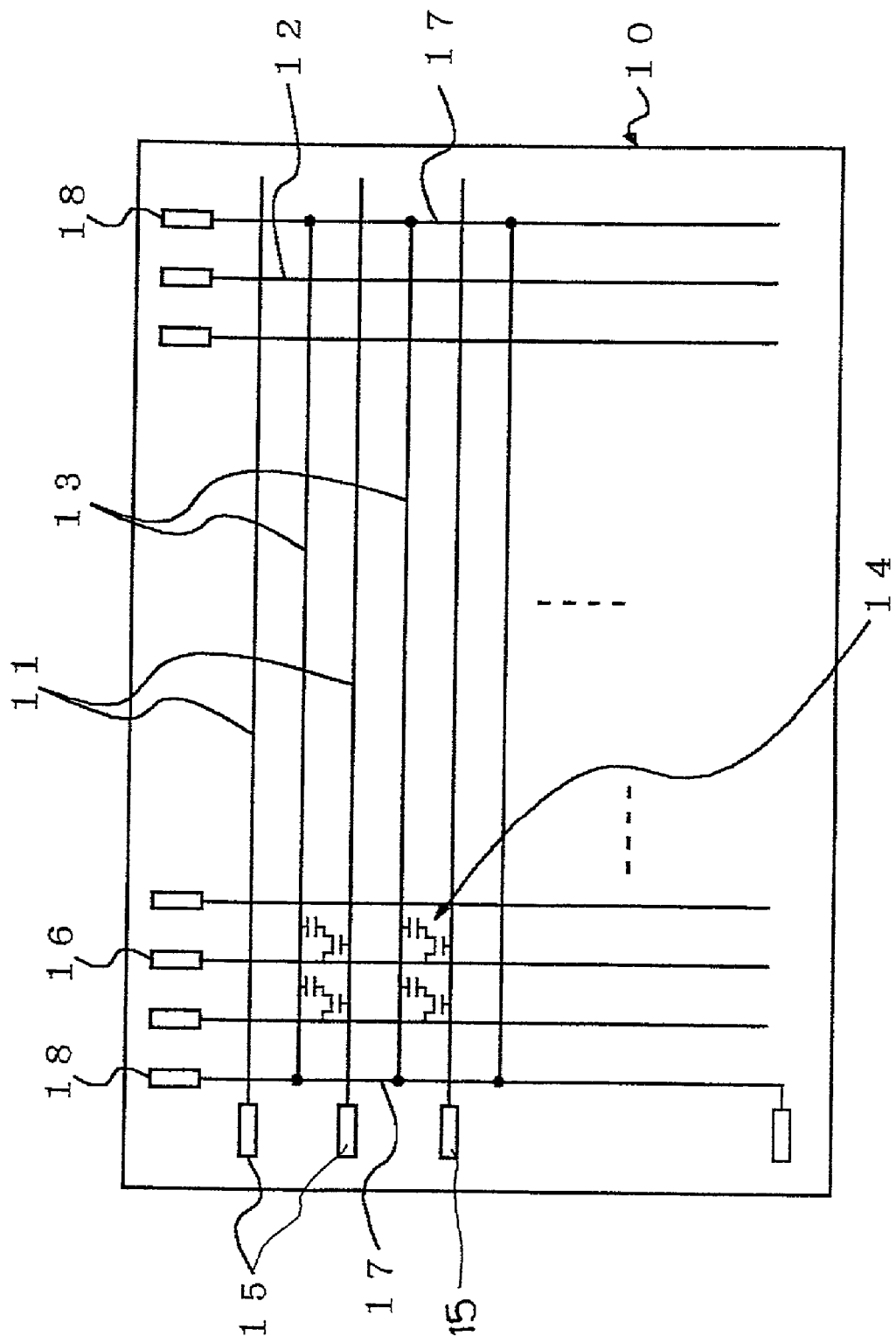
FIG. 3 is a schematic plane view showing the arrangement of components in a substrate structure incorporated in the reflective liquid crystal display panel.

Description is made on the substrate structure 10 with concurrent reference to FIGS. 2 and 3. The substrate structure 10 is fabricated on a transparent insulating substrate 10a, and includes conductive strips 11 for a scanning signal, conductive strips 12 for a data signal, conductive strips 13 for a constant voltage, an array of thin film transistors 14 and reflection electrodes 31. The conductive lines 11 for the scanning signal extend in parallel on the transparent insulating substrate 10a, and are connected to the gate electrodes of the rows of thin film transistors 14. The scanning signal is supplied through signal terminals 15 to the conductive strips 11 so as sequentially to cause the rows of thin film transistors 14 to turn on.

The conductive strips 12 for the data signal extend in the perpendicular direction to the conductive strips 11 for the scanning signal, and are connected to the drain regions of the columns of thin film transistors 14. The data signal is supplied through signal terminals 16 to the conductive strips 12 so as to distribute pieces of data information representative of an image to be produced to the columns of thin film transistors 14. Although the conductive strips 12 for the data signal cross the conductive strips 11 for the scanning signal, the conductive strips 12 for the data signal are electrically isolated from the conductive strips 11 for the scanning signal by means of a gate insulating layer 53. Thus, the conductive strips 11 for the scanning signal and the conductive strips 12 for the data signal define plural crossing points over the central area of the transparent insulating layer 10a, and the plural crossing points are assigned to the thin film transistors 14, respectively.

Figure 4:
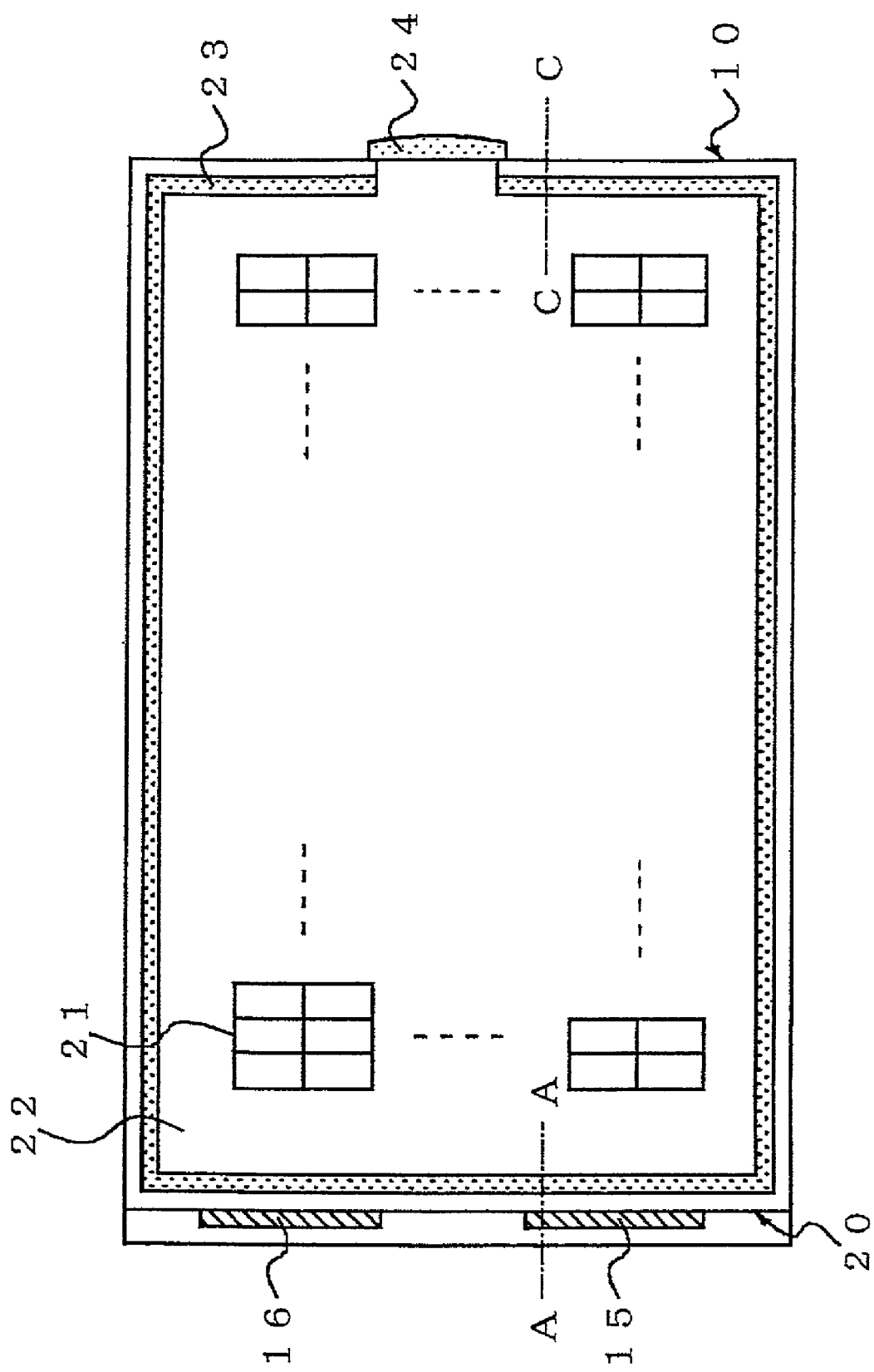
FIG. 4 is a schematic plane view showing the arrangement of components in another substrate structure incorporated in the reflective liquid crystal display panel.

Although the terminals 15 assigned to the scanning signal and the terminals 16 assigned to the data signal are arranged along the side line and along the end line of the substrate structure 10 in FIG. 3, both terminals 15/16 may be arranged along the side line of the substrate structure of a reflective liquid crystal display panel for a portable use (see FIG. 4).

The conductive strips 13 for the constant voltage extend in parallel to the conductive strips 11 for the scanning signal, and are widened at intervals. The wide portions of the conductive strips 13 are respectively associated with the thin film transistors 14, and serve as counter electrodes of holding capacitors. Terminals 18 are connected through distributing strips 17, which extend on both sides of the conductive strips 12, to the conductive strips 13, and the common voltage is applied through terminals 18 and the distributing strips 17 to the conductive strips 13. The common voltage finally reaches the counter electrodes.

The reflection electrodes 31 are arranged in matrix, and are respectively connected to the source regions of the thin film transistors 14. Thus, the reflection electrodes 31 serve as pixel electrodes, respectively. An inter-layered insulating layer 32 of organic compound is inserted between the array of thin film transistors 14 and the reflection electrodes 31, and the reflection electrodes 31 are respectively opposed to the counter electrodes thereunder. The array of reflection electrodes 31 is covered with an orientation layer 34. The orientation layer 34 is formed of organic compound, which makes an image-forming plane yellowish.

The inter-layered insulating layer 32 is formed with relatively large bumps, and the relatively large bumps make the reflection electrodes 31 rugged. The reflection electrode 31 has the upper surfaces with smooth surface morphology. The ruggedness on the upper surfaces is equal to or less than 1 micron in average pitches. It is more preferable that the average pitches are equal to or less than 0.6 micron. The smooth surface morphology prevents the image-forming plane from being yellowed. This is because of the fact that the smooth surface morphology reduces the light absorption to ultraviolet light component from 200 nanometer wavelength to 400 nanometer wavelength. The ruggedness in the upper surfaces of the reflection electrodes 31 is different from the relatively large bump. In this specification, words "surface morphology" means the ruggedness on the surfaces of the crystal structure.

The other substrate structure 20 is fabricated on a transparent insulating substrate 20a. As will be seen in FIG. 4, color filters 21 are patterned in a central area of the transparent insulating substrate 20a, and are surrounded by a black matrix 22. In this instance, the black matrix 22 is formed in the peripheral area, and does not occupy the central area. The black matrix makes the contrast of image fine. The color filters 21, i.e., red filters, green filters and blue filters are respectively aligned with the reflection electrodes 31, and are covered with a counter electrode 33. The counter electrode 33 in turn is covered with an orientation layer 34. The common voltage is applied to the counter electrode 33. In other words, the counter electrode 33 is equal in potential level to the counter electrodes of the holding capacitors. The orientation layer 34 of the substrate structure 10 is spaced from the orientation layer 34 of the other substrate structure 20 by means of the sealing layer 23 and the spherical spacers 35, and the liquid crystal LC2 fills the gap between the orientation layers 34. The liquid crystal LC2 is injected through an opening formed in the sealing layer 23, and the opening is closed with a plug 24. Dot-and-dash lines A—A and C—C are indicative of the cross sections under dots-and-dash lines A—A and C—C shown in FIG. 2. Each of the thin film transistors 14, reflection electrode 31 connected to the thin film transistor, the color filter 21 aligned with the reflection electrode, the counter electrode 33 and a piece of liquid crystal LC2 therebetween constitute a pixel. A set of red, green and blue filters, the reflection electrodes 31 aligned therewith, the thin film transistors 14 connected to the reflection electrodes 31 and pieces of liquid crystal LC2 therebetween form in combination a color pixel. Namely, a pixel with the red filter, pixel with the green filter and the pixel with the blue filter as a whole constitute each color pixel, and plural color pixels form the image forming plane.

The substrate structure 20 further has a quarter wavelength plate 37 and a polarizing plate 38. The quarter wavelength plate 37 is fixed to the surface of the transparent insulating substrate 20a reverse to the surface where the color filters 21 and the black matrix 22 are patterned, and is covered with the polarizing plate 38.

Though not shown in FIG. 4, a semiconductor chip is mounted on the terminals 16, and a driving circuit on the semiconductor chip is connected to the liquid crystal display panel. The liquid crystal display panel and the COG (Chip-On-Glass) integrated circuit as a whole constitute a liquid crystal display unit.

The liquid crystal display unit behaves as follows. The scanning signal causes the rows of thin film transistors 14 sequentially to turn on, and the data signal carries pieces of data information representative of a part of image to the reflection electrodes 31 associated with the selected row of thin film transistors. The data signal reaches the selected reflection electrodes 31, and creates local electric fields between the selected reflection electrodes 31 and the common electrode 33. The liquid crystal molecules 36 are selectively raised in the local electric fields. When the data signal reaches the reflection electrodes 31 associated with the final row of thin film transistors 14, the liquid crystal LC2 becomes partially transparent, and incident light 39 is reflected on the reflection electrodes 31. The reflection 40 passes through the transparent liquid crystal LC2, and forms the image on the image-forming plane.

The incident light passes through each orientation layer 34 twice. If the reflection electrodes have surface rough morphology represented by the average pitches greater than 1 micron, the orientation layer is widely varied in thickness, and the optical path in the orientation layer 34 is different between rays of the incident light depending upon the incident points. In the reflective liquid crystal display panel, the difference is increased twice. The orientation layer 34 is formed of the organic compound which has the transparency to the ultraviolet light components much smaller than the transparency to the visible light components. While the light 39 is traveling in the orientation layer 34, the ultraviolet light components are absorbed more than the visible light components. This results in that the yellowish image-forming plane.

On the contrary, the reflection electrodes 31 according to the present invention have the smooth surface morphology represented by the average pitches equal to or less than 1 micron. The orientation layer 34 is substantially uniform in thickness, and the light path of a ray of the incident light 39 is nearly equal to that of another ray of the incident light 39. Even though the rays pass the orientation layer 34 twice, the difference is not serious, and the ultraviolet light components are not absorbed in the orientation layer. Thus, the reflection electrodes 31 with the smooth surface morphology are effective against the yellowish image-forming plane.

Figure 5:
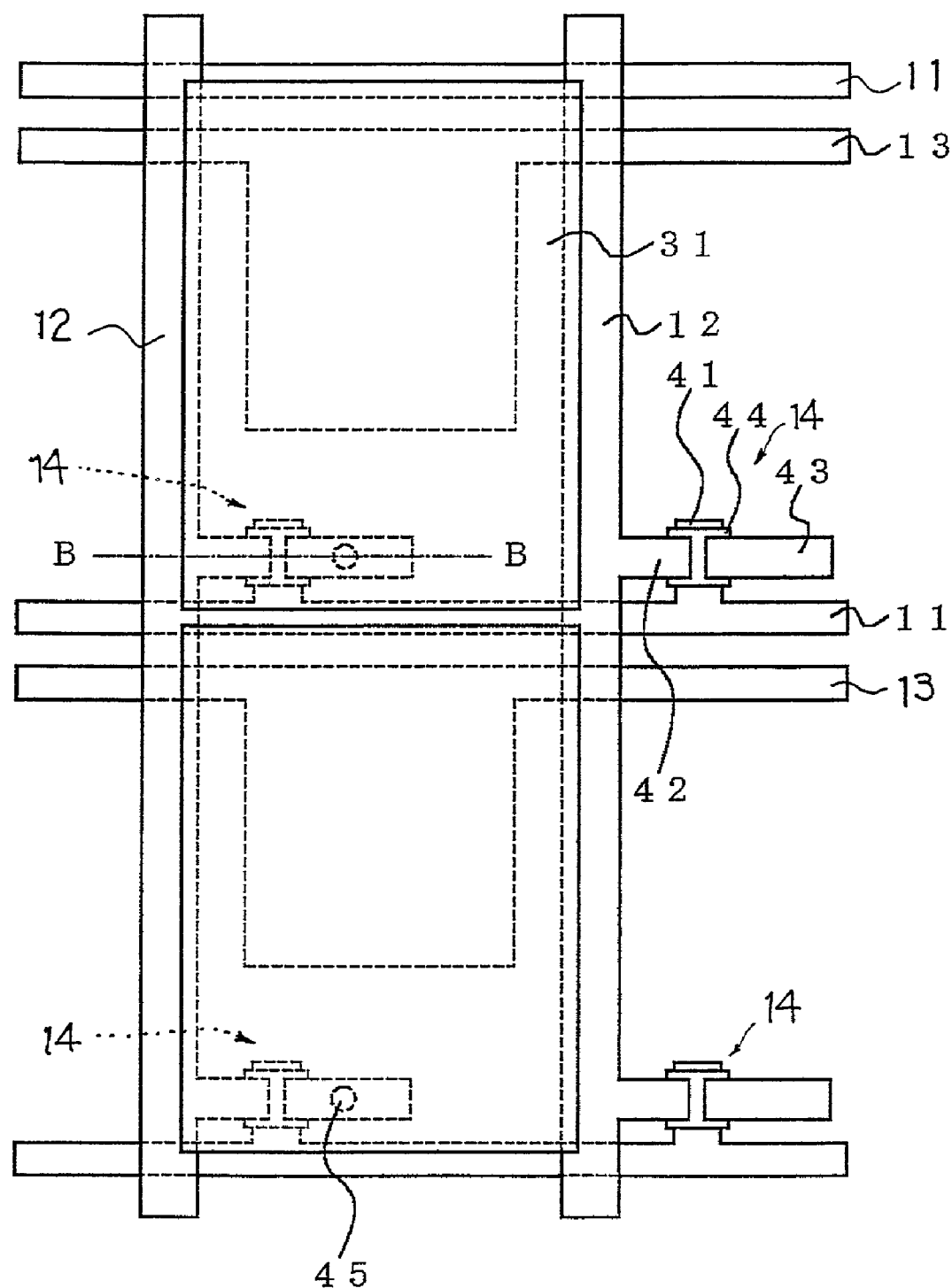
FIG. 5 is a plane view showing the layout of thin film transistors and reflection electrodes on the substrate structure shown in FIG. 3, FIGS. 6A to 6I are cross sectional views taken along line B—B of FIG. 5 and showing a process sequence for fabricating the liquid crystal display panel.

Description is hereinbelow made on a process for fabricating the liquid crystal display panel with reference to FIGS. 5, 6A to 6I and 7A to 7E. FIG. 5 shows the thin film transistors 14, which are respectively connected to the reflection electrodes 31. The thin film transistors 14 shown in FIG. 5 are located at the outermost position of the array. The thin film transistors 14 have an inverted staggered structure, and dot-and-dash line B—B is indicative of the cross section shown in FIGS. 6A to 6I. FIGS. 7A to 7E show a cross section of a peripheral region of the substrate structure 10. The cross section is taken along a line parallel to the short sides of the terminals 15/16/18.

In order to make the process clearly understandable, the layout of the color pixels and the structure thereof are described with reference to FIG. 5. As shown in FIG. 5, the conductive strips 11 for the scanning signals extend in parallel to one another, and the conductive strips 12 for the data signal extend perpendicularly to the conductive strips 11. The conductive strips 13 for the common voltage alternately extend in parallel to the conductive strips 11, and are close to the associated conductive strips 11. The conductive strips 11 and 12 define plural rectangular regions, and the thin film transistors 14 occupy the rectangular regions, respectively. The wide portions of the conductive strips 13 project into the rectangular regions, and are opposed to the associated reflection electrodes 31, respectively. The interlayered insulating layer 32 is sandwiched between the wide portions and the reflecting electrodes 31 so that the holding capacitors are produced over the rectangular regions, respectively. The thin film transistors 14 are similar in structure to one another. Each of the thin film transistors 14 has a gate electrode 41, a gate insulating layer 53 (see FIG. 6B), a drain electrode 42, a source electrode 43 and an active layer 44. A non-doped amorphous silicon layer 44a and heavily doped n-type amorphous silicon layer 44b form the active layer (see FIG. 6B).

The gate electrodes 41 of the thin film transistors 14 and the conductive strips 11 for the scanning signal are patterned on the major surface of the transparent insulating substrate 10a, and the gate electrodes 41 are merged with the associated conductive strips 11 for the scanning signal. Each gate electrode 41 is covered with the gate insulating layer 53, and the active layer 44 is patterned on the gate insulating layer 53 in such a manner as to be located over the associated gate electrode 41. Each of the active layers 44 serves as a drain region and a source region of the thin film transistor 14.

The drain electrodes 42, source electrodes 43 and the conductive strips 12 for the data signal are patterned on the gate insulating layer 53. The drain electrodes 42 are merged with the associated conductive strips 12, and are held in contact with the drain region in the active layer 14. On the other hand, the source electrode 43 is held in contact with the source region in the active layer 14. The drain electrodes 42, source electrodes 43 and the conductive strips 12 for the data signal are covered with a passivation layer 54 (see FIG. 6D). The passivation layer 54 prevents the thin film transistors 14 from damages, and two insulating layers 51 and 52 are laminated on the passivation layer 54. The insulating layer 51 forms steep bumps, and the other insulating layer 52 makes the steep bumps mild. Thus, the insulating layers 51 and 52 create proto-bumps, which are transferred to the reflection electrodes 31 for forming the large bumps. The large bumps aim at uniform reflection characteristics over the image-forming plane. For this reason, the insulating layer 51 is irregularly formed on the central area of the substrate structure 10 which is assigned to the color pixels. However, the insulating layer 51 does not extend into the peripheral area which is assigned to the terminals. On the other hand, the insulating layer 52 extends over the central area, and penetrates into the peripheral area so that the proto-bumps are perfectly covered with the insulating layer 52. The passivation layer 53 and the insulating layers 51/52 as a whole constitute the inter-layered insulating layer 32.

Source contact holes 45 are formed in the insulating layers 51/52 as well as the passivation layer 54. The source contact holes 45 reach the source electrodes 43, respectively. The reflection electrodes 31 are formed on the insulating layer 52, and occupy the rectangular regions, respectively. The reflection electrodes 31 pass through the source contact holes 45, and are held in contact with the source electrodes 43, respectively.

The proto-bumps are transferred from the insulating layer 51 to the reflection electrodes 31, and the large bumps impart predetermined optical characteristics to the reflection 40. Thus, the large bumps deeply concern the quality of image formed on the image-forming plane. For this reason, the large bumps are designed to achieve the optical characteristics. In the design work, the pitches of the bumps, pitches of valleys, the height of the bumps and the depth of the valleys are taken into account. The large bumps are designed in such a manner that one of the pitches, height and depth has more than one value, i.e., two values or more than two values.

The insulating layer 51 further has an influence on electric characteristics of the pixels. As shown in FIG. 5, the conductive strips 11 for the scanning signal and the conductive strips 12 for the data signal are partially overlapped with the reflection electrodes 31, and the inter-layered insulating layer 31, i.e., the passivation layer 54 and the insulating layers 51/52 are inserted between the conductive strips 11/12 and the reflection electrodes 31. The conductive strips 11/12, the inter-layered insulating layer 32 and the reflection electrodes 31 undesirably form parasitic capacitors. If the insulating layer 51 is too thin, the incident light 39 is not widely changed in direction, and the parasitic capacitors have large capacitance. The large capacitance makes the signal propagation through the conductive strips 11/12 slow, and the pieces of data information are hardly written into the reflection electrodes 31. Moreover, the local electric fields are undesirably made strong, and the strong local electric fields give rise to serious turbulence in the orientation of the liquid crystal molecules in the vicinity of the pixels. This results in poor contract in the image produced on the image-forming plane. In order to prevent the pixels from those problems, it is necessary that the insulating layer 51 be fallen within the range between 1 micron thick to 3 microns thick.

The other insulating layer 52 is designed to make the steep bumps mild. If the insulating layer 52 is too thin, the proto-bumps become too steep, and the manufacturer suffers from the poor step-coverage. On the other hand, if the insulating layer 52 is too thick, the large bumps are not formed in the reflection electrodes 31. In this instance, the insulating layer 52 ranges from 0.3 micron thick to 1.5 microns thick.

FIGS. 6A to 6I and 7A to 7E show a process sequence including the steps of (1) patterning a metal layer into the gate electrodes 41, terminals 151 16/18 and the conductive strips 11/13, (2) patterning amorphous silicon layers on the gate insulating layer into the active layers 44, (3) patterning a metal layer into the conductive strips 12 and the source/drain electrodes 43/42, (4) forming the contact holes in the passivation layer 54, (5) patterning a transparent conductive layer into terminal connecting electrodes, (6) patterning an insulating layer into the proto-bumps, (7) forming contact holes in the insulating layer 52 deposited over the proto-bumps and (8) patterning a metal layer into the reflection electrodes 31.

Figure 6:
Figure 6:
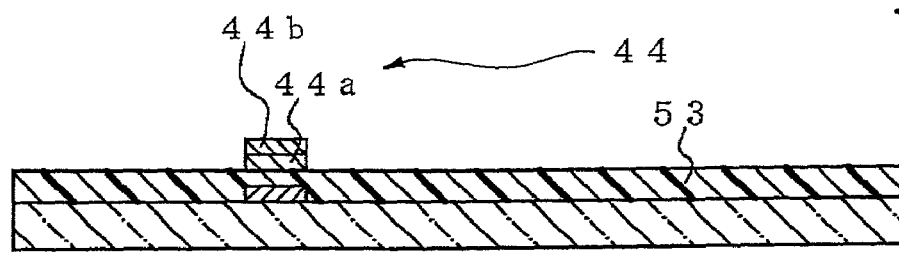
Figure 6:
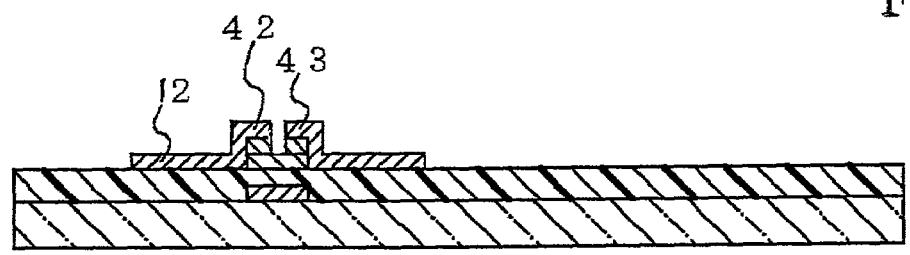
Figure 6:
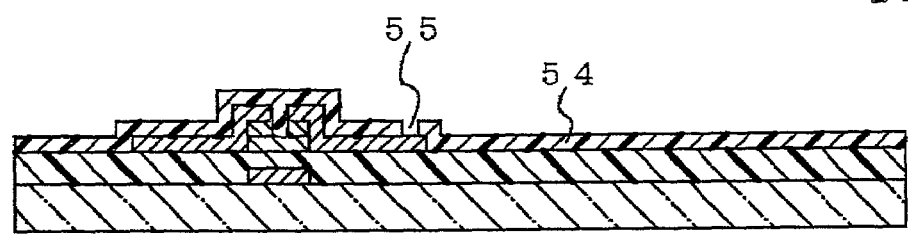
Figure 6:
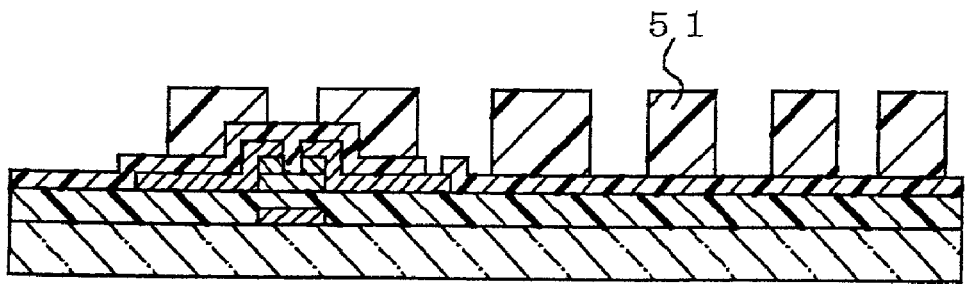
Figure 6:
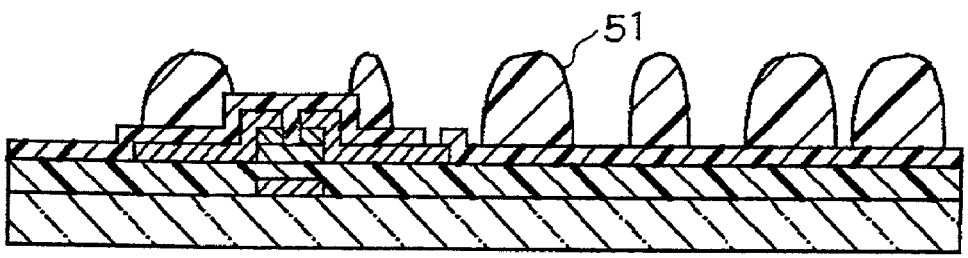
Figure 6:
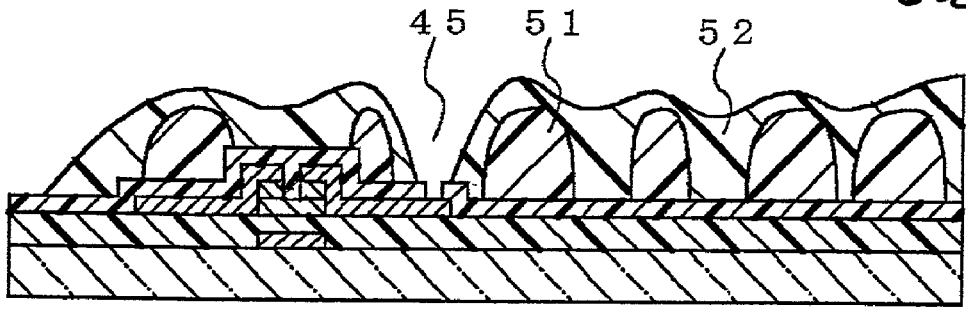
Figure 6:
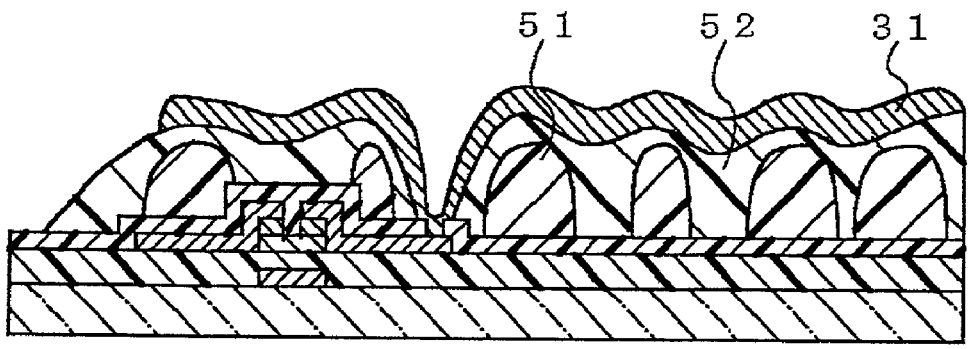
Figure 61:
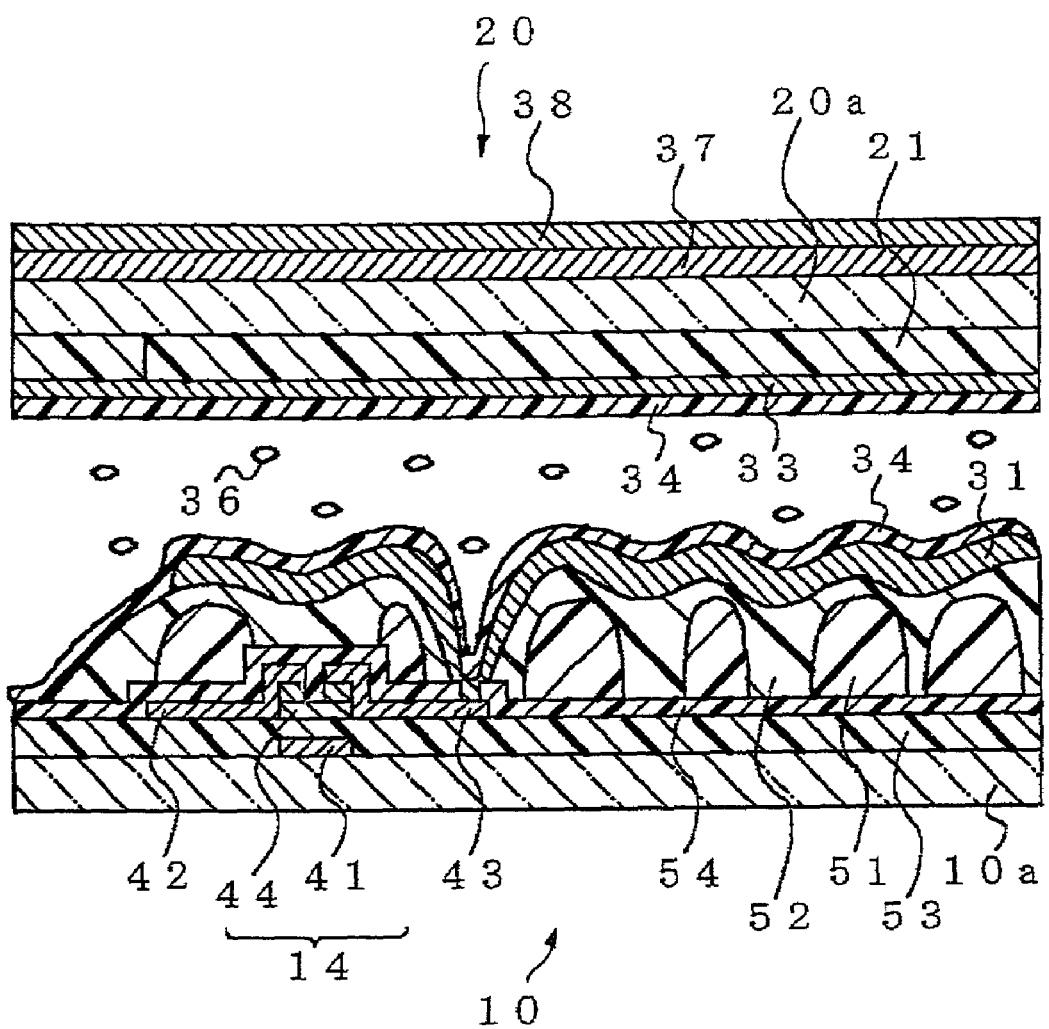
Figure 7:
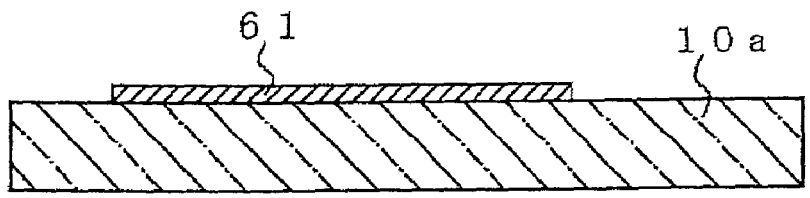
FIGS. 7A to 7E are cross sectional views showing the process sequence on another cross section.
Figure 7:
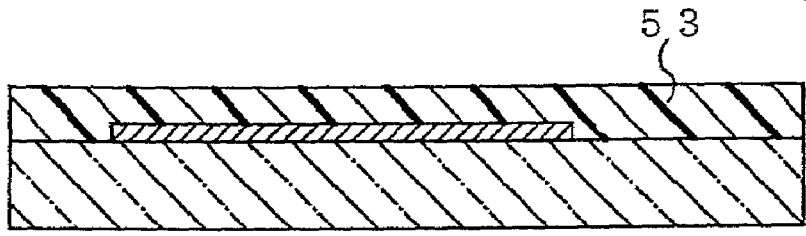
Figure 7:
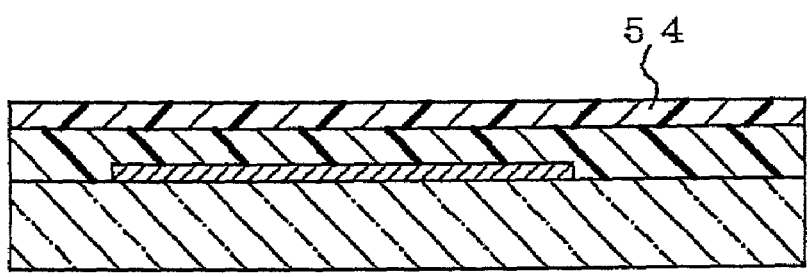
Figure 7:
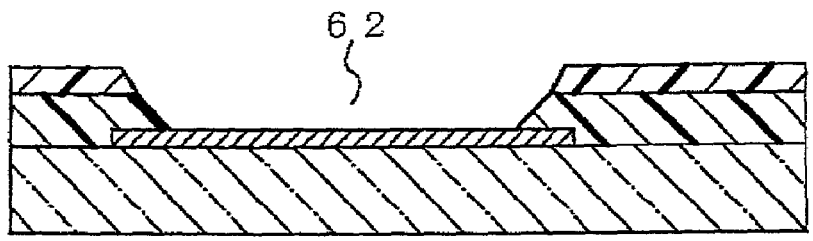
Figure 7:
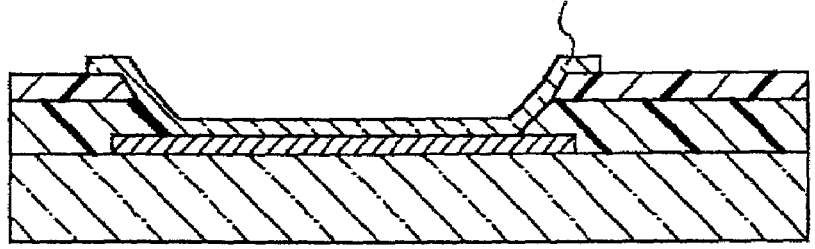

The process starts with preparation of the transparent insulating substrate 10a. The transparent insulating substrate 10a is formed of no-alkali glass, and is 0.5 millimeter thick. A chromium target is sputtered so as to deposit a chromium layer to 100 nanometers thick to 300 nanometers thick over the entire surface of the transparent insulating substrate 10a. A photo-resist etching mask (not shown) is prepared on the chromium layer, and the chromium layer is partially etched away. The gate electrodes 41, conductive strips 11 for the scanning signal, conductive strips 13 for the common voltage, metal layers 61 for the terminals 15/16/18 are left on the major surface of the transparent insulating substrate 10a. Although the conductive strips 11 for the scanning signal and the conductive strips 13 for the common voltage are not seen, the resultant structure is shown in FIGS. 6A and 7A.

The gate electrodes 41, conductive strips 11/13 and the metal layers 61 may be formed of another kind of metal or alloy in so far as the metal/alloy is formed in a thin film and patterned. The another kind of metal/alloy is Mo, Al or aluminum alloy, by way of example. The gate electrodes 41, conductive strips 11/13 and the metal layers 61 may have a multi-layered structure such as, for example, an aluminum, aluminum alloy or molybdenum layer overlaid by a barrier metal layer of chromium, molybdenum or titanium. Subsequently, silicon nitride, i.e., SiNx is deposited to 300 nanometers thick to 500 nanometers thick over the entire surface of the resultant structure by using a plasma-assisted chemical vapor deposition technique, and forms the gate insulating layer 53. The gate electrodes 41 and the metal layers 61 are covered with the gate insulating layer 53. FIG. 7B shows the metal layer 61 covered with the gate insulating layer 53.

Undoped amorphous silicon is deposited to 150 nanometers thick to 300 nanometers thick over the gate insulating layer 53 also by using the plasma-assisted chemical vapor deposition, and heavily-doped n-type amorphous silicon is further deposited to 30 nanometers thick to 50 nanometers thick. The undoped amorphous silicon forms the undoped amorphous silicon layer, and the heavily-doped n-type amorphous silicon forms the n+ amorphous silicon layer on the undoped amorphous silicon layer. A photo resist etching mask is prepared by using the photo-lithographic techniques, and the undoped amorphous silicon layer and the n+ amorphous silicon layer are patterned into the undoped amorphous silicon strips 44a and the n+ amorphous silicon strips 44b as shown in FIG. 7B. The undoped amorphous silicon strips 44a and the n+ amorphous silicon strips 44b form in combination the active layers 44, and the active layers 44 are arranged over the gate electrodes 41 at intervals. The n+ amorphous silicon strips 44b form ohmic contacts together with the source/drain electrodes 43/42.

Subsequently, chromium is deposited to 100 nanometers thick to 300 nanometers thick over the entire surface of the resultant structure by using the sputtering technique. A photo resist mask is prepared by using the photo-lithographic techniques. Using the photo resist etching mask, the chromium layer is patterned into the drain electrodes 42, source electrodes 43 and the conductive strips 12 for the data signal by using a dry etching technique.

The drain/source electrodes 42/43 and the conductive strips 12 may be formed of another kind of metal or alloy in so far as the metal/alloy is formed in a thin film and pattered. The another kind of metal/alloy is Mo, Al or aluminum alloy, by way of example. The conductive strips 12 and the source/drain electrodes 42/43 may have a multi-layered structure such as, for example, an aluminum, aluminum alloy or molybdenum layer overlaid by a barrier metal layer of chromium, molybdenum or titanium.

Using the drain/source electrodes 42/43 as an etching mask, the n+ amorphous silicon strips 44b are partially etched by using a dry etching technique, and the ohmic contact portions are separate from each other. Thus, the channel region is only formed in the undoped amorphous silicon strip 44a, and the conductivity of the channel region is controlled by the gate potential at the associated gate electrode 41. In other words, the current does not flow directly between the ohmic contact portions. The resultant structure is shown in FIG. 6C.

Subsequently, silicon nitride is deposited to 100 nanometers thick to 300 nanometers thick over the entire surface of the resultant structure by using the plasma-assisted chemical vapor deposition, and forms the passivation layer 54. The drain electrodes 42 and the source electrodes 43 are covered with the passivation layer 54, and the gate insulating layer 53 is overlaid by the passivation layer 54 (see FIG. 7C). The passivation layer 54 prevents the undoped amorphous silicon strips 44a from undesirable ions so that malfunction does not take place in the thin film transistors 14.

A photo resist etching mask is prepared on the passivation layer 54 by using the photo-lithographic techniques. Using the photo resist etching mask, the gate insulating layer 53 and/or the passivation layer 54 are partially etched away for forming the contact holes 55/62, and the source electrodes 43 and the metal layers 61 are exposed to the contact holes 55/62 as shown in FIGS. 6D and 7D. Though not shown in the drawings, contact holes are concurrently formed in the passivation layer 54 and/or the gate insulating layer 53 so that the conductive strips 13 for the common voltage, metal layers 61 for the data signal and the conductive strips 12 adjacent to the metal layers 61 are exposed to the contact holes.

Subsequently, transparent material such as, for example, ITO (Indium-Tin-Oxide) is deposited to 40 nanometers thick to 100 nanometers thick by using a sputtering technique, and the indium-tin-oxide layer is patterned into connecting electrodes 63 held in contact with the metal layers 61 for the terminals 151 16/18, the interconnecting strips 17 and interconnections between the conductive strips 12 and the terminals 16. However, the indium-tin-oxide layer is not left in the central area assigned to the image forming plane. For this reason, if the source electrodes 43 are formed of molybdenum or aluminum sandwiched between molybdenum or aluminum alloy sandwiched between molybdenum, the indium-tin-oxide layer is to be etched by using a sort of etchant inactive to the molybdenum. Oxalic acid-containing etchant may be used in the etching. On the other hand, if the source electrodes 43 are formed of chromium, aluminum or aluminum sandwiched between chromium or titanium, the etchant may be an aqua regia series or a ferric chloride series. The reason why the indium-tin-oxide is removed from the central area assigned to the image-forming plane is that the indium-tin-oxide forms a battery together with aluminum. Even if the indium-tin-oxide is laminated on the source electrodes 43, the indium-tin-oxide layers are liable to peel off due to the battery phenomenon. The indium-tin-oxide layers 63 on the metal layers 61 enhances the reliability of the COG (Chip-On-Glass) mounting. FIG. 7E shows one of the terminal 15/16/18 implemented by the lamination of the metal layer 61 and the indium-tin-oxide layer 63.

Subsequently, solution of photo-sensitive novolak resin is spread over the resultant structure, and forms a photo-sensitive novolak resin layer of 1 micron thick to 3 microns thick. A pattern image for the proto-bumps is transferred to the photo-sensitive novolak resin layer, and the latent image is developed in alkaline developing solution. Then, bumps are irregularly formed in the insulating layer 51 of the photo-sensitive novolak in the central area assigned to the image-forming plane (see FIG. 6E). The bumps are defined by steep walls. In case where photo-sensitive substance is used for the insulating layer 51, the proto-bumps are produced through the process sequence including the steps of (1) spreading the photo-sensitive substance, (2) pattern transfer to the photo-sensitive substance layer and (3) developing the latent image produced in the photo-sensitive substance layer.

The insulating layer 51 is formed of either photo-sensitive or photo-insensitive substance. If the photo-insensitive substance is used for the insulating layer 51, the proto-bumps are produced through a process sequence including (1) spreading the photo-insensitive substance, (2) coating the photo-insensitive substance layer with a photo resist layer, (3) pattern transfer to the photo resist layer, (4) developing the latent image, (5) etching the photo-insensitive substance layer by using the patterned photo resist layer and (6) removing the patterned photo resist layer from the upper surface of the photo-insensitive layer. Thus, the usage of photo-sensitive substance makes the process sequence simple. Subsequently, the steep walls are made mild. The resultant structure shown in FIG. 6E is placed in a furnace chamber, and the bumps are treate4d with heat at 80 degrees to 200 degrees in centigrade. The surface portions of the bumps are reflowed in the high temperature ambience, and the steep walls are varied to gentle walls. Thus, the insulating layer 51 is formed with the proto-bumps through the reflow. The proto-bumps may be formed by melting the surface portions in chemicals such as, for example, N-methyl-2-pyrrolidone. The resin is baked at 200 degrees to 250 degrees in centigrade, and the insulating layer 51 with the proto-bumps is obtained as shown in FIG. 6F.

Subsequently, solution of photo-sensitive novolak is spread over the entire surface of the resultant structure, and forms the photo-sensitive novolak layer of 0.3 micron thick to 1.5 microns thick. A pattern image is transferred to the photo-sensitive novolak layer, and the latent image is developed in the alkaline developing solution. Then, the contact holes 45 are formed in the photo-sensitive novolak layer. The photo-sensitive novolak layer is baked at 200 degrees to 250 degrees in centigrade, and the insulating layer 51 is covered with the insulating layer 52. The contact holes 55 are nested in the contact holes 45, respectively, and the source electrodes 43 are exposed to the contact holes 45, respectively, as shown in FIG. 6G.

In this instance, the insulating layers 51/52 are formed of the organic compound in the novolak series. Another substance available for the insulating layers 51/52 is PC403 manufactured by JSR. The insulating layers 51 and 52 may be different in substance. For example, acrylic resin and polyimide are selectively used for the insulating layers 51 and 52. A combination of organic substance and inorganic substance may be selectively used for the insulating layers 51 and 52. The combination of silicon nitride and acrylic resin and the combination of silicon oxide and polyimide are examples of the combination of organic compound and inorganic compound. The proto-bumps are formed in the insulating layer 51 of any one of the organic/inorganic substance layer.

In the first embodiment, the photo-lithographic techniques are used for the insulating layers 51/52. The insulating layers 51/52 may be formed through a printing technique. The printing technique makes the process simple. Other technologies available for the insulating layers 51/52 are a wet process such as, for example, liquid-phase growing techniques and a dry process such as, for example, plasma polymerization techniques. Thus, various insulating substance layers, in which the out-gassing are observed, are referred to as "insulating layers 51/52".

Subsequently, molybdenum and, thereafter, aluminum-neodymium alloy are deposited to 50 nanometers thick to 200 nanometers thick and 100 nanometers thick to 300 nanometers thick over the resultant structure by using sputtering techniques, and a molybdenum layer and an aluminum-neodymium layer are laminated over the inter-layered insulating layer 32. The molybdenum layer passes through the contact holes 45/55, and is held in contact with the source electrodes 43.

A photo resist etching mask is prepared on the aluminum-neodymium layer by using the photo-lithographic techniques, and the aluminum-neodymium layer and the molybdenum layer are selectively etched away through a wet etching at 40 degrees to 60 degrees in centigrade for forming the reflection electrodes 31 as shown in FIG. 6H. The wet etchant contains phosphoric acid, acetic acid and nitric acid. Since the reflection electrodes 31 further serve as pixel electrodes, the reflection electrodes 31 are separated at intervals along the conductive strips 11 and conductive strips 12. The molybdenum layer and the aluminum-neodymium layer are removed from the peripheral area. Thus, the molybdenum layer and the aluminum-neodymium layer are never left on the terminals 15/16/18. The molybdenum layer serves as a barrier metal between the indium-tin-oxide layer 63 and the aluminum-neodymium layer. While the aluminum-neodymium layer is being patterned, the barrier metal prevents the indium-tin-oxide layer 63 from the wet etchant. If the wet etchant reaches the indium-tin-oxide layer 63, a battery is undesirably produced between the indium-tin-oxide layer 63 and the aluminum-neodymium layer, and the indium-tin-oxide layer 63 tends to peel off. Thus, the molybdenum layer is to be thick enough to prevent the indium-tin-oxide layers 63 from the wet etchant.

The sputtering conditions are hereinbelow described in detail. First, the resultant substrate structure shown in FIG. 6G is inserted into a heating chamber, and the substrate structure is heated in vacuum at 70 degrees to 170 degrees in centigrade for 1–2 minutes. The water is vaporized in the high temperature ambience, and is eliminated from the insulating layers 51/52. When the water is eliminated from the insulating layers 51/52, the substrate structure is conveyed from the heating chamber to a sputtering chamber. Vacuum is developed in the sputtering chamber, and the molybdenum and aluminum-neodymium alloy are successively deposited over the substrate structure in the sputtering chamber.

It is preferable that the vacuum is developed in the sputtering chamber independently of the heating chamber. If the heat application and the sputtering are carried out in a single chamber, the vapor out-gassing from the insulating layers 51/52 changes the quality of the sputtered metal/alloy, and the contact resistance between the reflection electrodes and the source electrodes is undesirably increased. If the heating and sputtering are carried out in the same chamber, the heating is prolonged to 2–5 minutes, and the gaseous components are to be perfectly evacuated from the chamber during the sputtering.

The aluminum-neodymium alloy thus deposited under the above-described conditions is free from the cloudy surface, and, accordingly, achieves a high reflectivity. Moreover, the contact resistance between the source electrodes 43 and the reflection electrodes 31 is low and stable.

The substrate temperature may be different between the deposition of molybdenum and the deposition of aluminum-neodymium. It is preferable that the substrate temperature in the deposition of molybdenum is higher than the substrate temperature in the deposition of aluminum-neodymium. For example, the deposition of molybdenum is carried out at substrate temperature of 150 degrees in centigrade, and the substrate temperature in the deposition of aluminum-neodymium is, by way of example, 120 degrees in centigrade. This is because of the fact that the deposition at a relatively low substrate temperature makes the crystal of molybdenum poor. The poor crystal is influential in the crystal of aluminum-neodymium alloy, and the poor crystals do not permit the wet etchant to form a fine profile in the reflection electrodes 31. Of course, the substrate temperature may be equal between the deposition of molybdenum and the deposition of aluminum-neodymium alloy.

It is preferable that the aluminum-neodymium alloy contains the neodymium at least 0.5 weight %. The neodymium content equal to or greater than 0.5 weight % is effective against hillock during the firing on the orientation layer 34, and keeps the reflectivity high. It is further preferable that the substrate structure is maintained at 170 degrees in centigrade or less during the deposition of the aluminum-neodymium alloy. The deposition at 170 degrees in centigrade or less makes the surface morphology on the reflection electrodes 31 equal to or less than 1 micron in average pitches, and the resultant aluminum-neodymium electrodes achieve the reflectivity equal to or greater than 90% to 200 nanometer wavelength to 400 nanometer wavelength light components with respect to the reflectivity to the visible light components at 400 nanometer wavelength. The high reflectivity to the 200 nm to 400 nm wavelength light components is effective against the yellowish image-forming plane regardless of the substance for the orientation layer 34. However, the neodymium content greater than 10 weight % is not preferable. If the neodymium content exceeds 10 weight %, the reflection electrodes 31 become cloudy, and can not achieve a high reflectivity to the visible light components. Thus, the preferable range of the neodymium content is from 0.5 weight % to 10 weight %.

In this instance, the aluminum-neodymium alloy is desirable from the viewpoint of the high reflectivity and good alignment with the process for fabricating the thin film transistors 14. However, any metal or alloy is available for the reflection electrodes 31 in so far as the metal/alloy exhibits high reflectivity. Another sort of aluminum alloy such as, for example, aluminum-titanium alloy or aluminum-molybdenum alloy is available for the reflection electrodes 31. Otherwise, the reflection electrodes 31 may be formed of high-reflective metal such as, for example, silver.

Finally, the orientation layer 34 is formed on the array of reflection electrodes 31. In detail, organic compound is printed on the resultant structure by using a printing technique. The organic compound layer is 50 nanometers thick to 100 nanometers thick. The organic compound layer is baked at 200 degrees to 230 degrees in centigrade, and is oriented. As a result, the substrate structure 10 is obtained.

The other substrate structure 20 is fabricated on the transparent insulating substrate 20 independently of the above-described process sequence. The color filters 21 are patterned on the transparent insulating substrate 20a, and the indium-tin-oxide is deposited over the color filters 21 for forming the counter electrode 33. The black matrix 22 is formed in the peripheral area around the color filters 21. The organic compound of 50 nanometers thick to 100 nanometers thick is printed on the counter electrode 33, and the organic compound layer is baked at 200 degrees to 230 degrees in centigrade. The orientation layer 34 is completed through the orientation process. It is preferable that the organic compound makes the orientation layer achieve transparency equal to or greater than 95% to the light components from 300 nanometer wavelength to 600 nanometer wavelength.

The spherical spacers 35 of synthetic resin are scattered in the central area of the substrate structure 10, and sealing agent of epoxy resin series is provided on the peripheral area along the edges of the substrate structure. The substrate structures 10 and 20 are opposed to each other as shown in FIG. 6I, and are assembled. The spherical spacers 35 keep the substrate structures 10 and 20 spaced by a predetermined gap. The sealing layer has an opening (see FIG. 4), and the liquid crystal LC2 is injected through the opening into the gap. The opening is closed with a piece of ultra-violet curable resin 24 in the aclylate series, and the piece of ultra-violet curable resin 24 is solidified. Thus, the liquid crystal LC2 is confined in the space between the substrate structures 10 and 20.

The quarter wavelength plate 37 and the polarization plate 38 are successively adhered to the transparent insulating substrate 20a. Though not shown in the drawings, the semiconductor chip is mounted on the peripheral area of the resultant structure, and the conductive pads of the semiconductor chip is connected to the terminals 15/16/18 for the scanning signal, data signal and the common voltage.

As will be understood from the foregoing description, the liquid crystal display panel according to the present invention includes the reflection electrodes with the smooth surface morphology at average pitches equal to or less than 1 micron. The smooth surface morphology reduces the light absorption in the light ranging from 200 nanometer wavelength to 400 nanometer wavelength, and prevents the image-forming plane from being yellowed.

Moreover, while the aluminum-neodymium alloy is growing at the substrate temperature equal to or less than 170 degrees in centigrade, the surface morphology of the aluminum-neodymium alloy layer is equal to or less than 1.0 micron in average pitches.

Second Embodiment

Another liquid crystal display panel embodying the present invention is similar to the first embodiment except an inter-layered insulating layer between the array of thin film transistors 14 and the reflection electrodes 31. For this reason, the other layers, strips and substrates are labeled with the references same as those designating corresponding layers, strips and substrates incorporated in the first embodiment. Description is hereinbelow made on a process for fabricating the liquid crystal display panel implementing the second embodiment with reference to FIGS. 5, 6A–6D, 7A–7E and 8A–8E. FIGS. 8A–8E shows the cross section taken along line B—B of FIG. 5.

The process comprises the steps of (1) patterning a metal layer into the gate electrodes 41 and the conductive strips 11 for the scanning signal, (2) patterning the undoped/n+ amorphous silicon layers on the gate insulating layer 53 into the active layers 41, (3) patterning a metal layer into the drain/source electrodes 42/43 and the conductive strips 12 for the data signal, (4) forming the passivation layer 54, (5) patterning the transparent conductive layer into the terminal connecting electrodes 63, (6) forming bumps in an inter-layered insulating layer 71 and (7) patterning the alloy layer into the reflection electrodes 31.

Figure 8A:
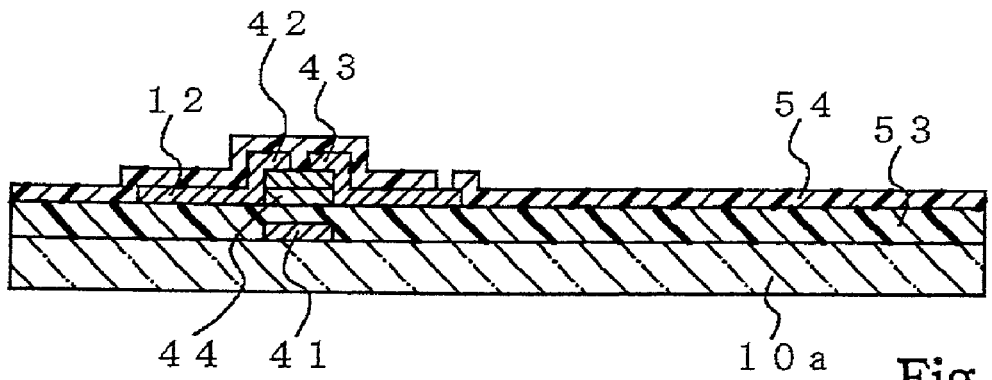
FIGS. 8A to 8E are cross sectional views showing essential steps of another process sequence for fabricating another liquid crystal display panel according to the present invention.

The process starts with preparation of the transparent insulating substrate 10a, and the steps (1) to (5) are similar to those of the first embodiment. The array of thin film transistors 14, passivation layer 54, terminals 15 for the scanning signal, terminals 16 for the data signal and the terminals 18 for the common voltage are patterned on or over the transparent insulating substrate 10a as shown in FIGS. 7E and 8A.

Figure 8B:
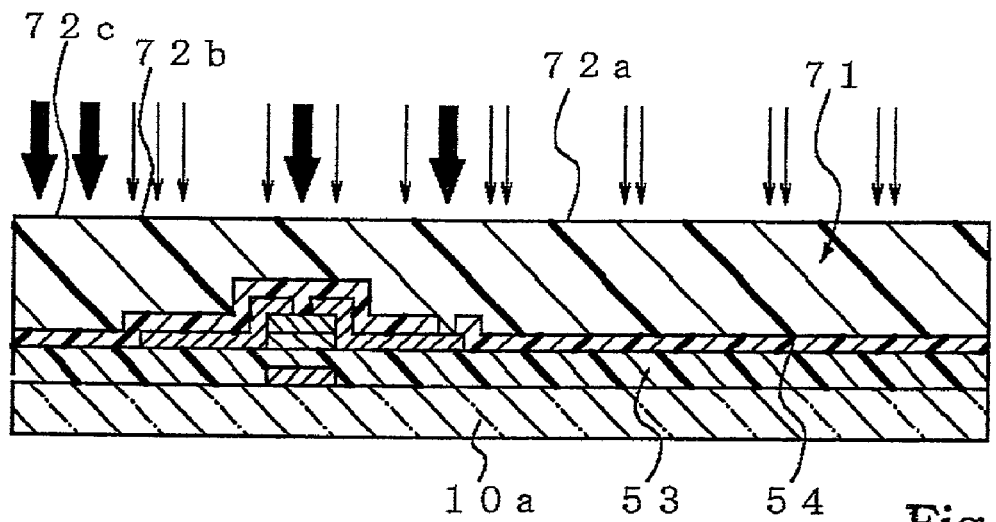

Subsequently, photo-sensitive novolak resin is spread over the resultant structure, and forms a photo-sensitive novolak resin layer 71 of 2.0 to 4.5 microns thick. A half-tone mask is aligned with the resultant structure, and a pattern image is transferred from the half-tone mask to the photo-sensitive novolak resin layer 71 as shown in FIG. 8B. The half-tone mask has a transparent pattern, a semi-transparent pattern and a non-transparent pattern. The transparent pattern is transparent to the exposure light, and the non-transparent pattern does not pass the exposure light. The exposure light is partially absorbed in the semi-transparent pattern. The non-transparent pattern is assigned to a region 72a not to be etched, i.e., high land portions of the inter-layered insulating layer 71, and the semi-transparent pattern is assigned to the region 72b partially to be etched, i.e., valleys in the inter-layered insulating layer 71. The transparent pattern is assigned to the other portion 72c to be completely etched. The half-tone mask is designed in such a manner that the semi-transparent pattern is adjacent to the transparent pattern. The half-tone mask is radiated with light, and image-carrying light is fallen onto the photo-sensitive novolak resin layer 71. The image-carrying light forms a latent image in the photo-sensitive novolak resin layer 71.

Figure 8C:
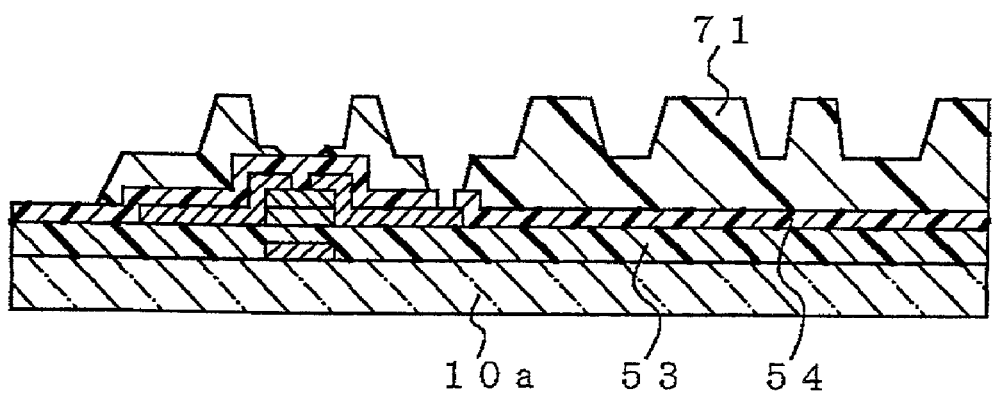
Figure 8:
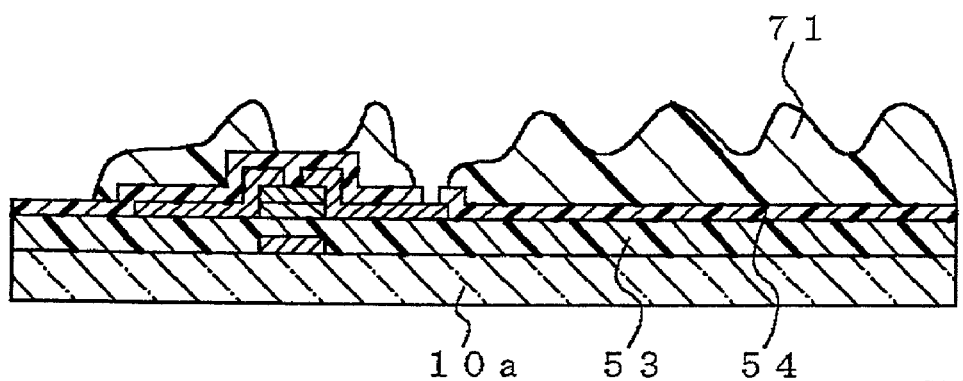
Figure 8:
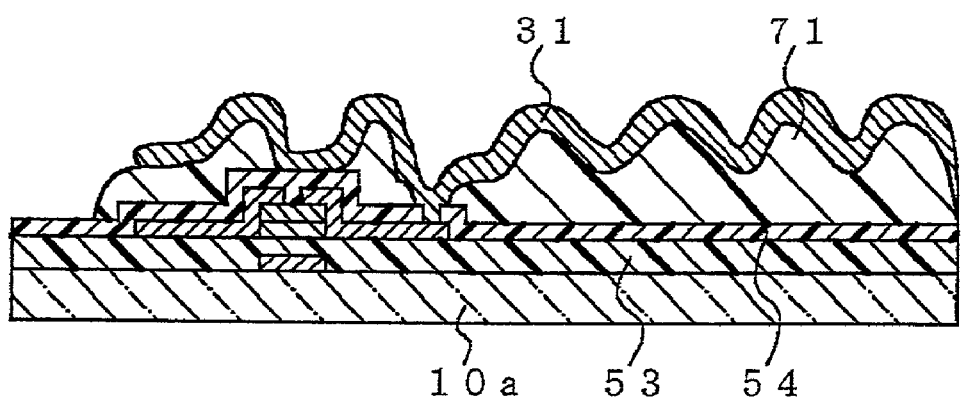

The latent image is developed. The region aligned with the nontransparent pattern is left on the structure, and the region aligned with the transparent pattern is removed from the structure. The region aligned with the semi-transparent pattern is partially etched so that the valleys are formed in the inter-layered insulating layer 71. The semi-transparent pattern is adjacent to the transparent pattern. In other words, the non-transparent pattern is not contiguous to the transparent pattern. Although bumps are formed in the inter-layered insulating layer 71, the inter-layered insulating layer 71 has a gentle contour as shown in FIG. 8C.

The half-tone mask varies the intensity of the exposure light, and the latent image has dispersion in depth corresponding to the dispersion in the light intensity. The latent image may be formed by varying the exposure time. Thus, the bumps are formed in the single inter-layered insulating layer 71. The inter-layered insulating layer 71 is corresponding to the two insulating layers 51 and 52. Thus, the bumps are formed through a relatively simple sequence.

Subsequently, the resultant structure is treated with heat at 80 degrees to 200 degrees in centigrade, and the inter-layered insulating layer 71 is re-flowed. The surface of the inter-layered insulating layer 71 becomes gentle. The gentle surface may be created by using chemicals. The inter-layered insulating layer is baked at 200 degrees to 250 degrees in centigrade, and proto-bumps are formed in the inter-layered insulating layer 71 as shown in FIG. 8D.

The remaining process sequence is similar to that of the first embodiment. Molybdenum and aluminum-neodymium are successively deposited to 50 nanometers thick to 200 nanometers thick and 100 nanometers thick to 300 nanometers thick over the entire surface of the resultant structure by using the sputtering. The preliminary heating and the sputtering conditions are similar to those of the first embodiment. The aluminum-neodymium layer and the molybdenum layer are patterned into the reflection electrodes 31 through the photo-lithography and etching as shown in FIG. 8E. The reflection electrodes 31 have the smooth surface morphology with the average pitches equal to or less than 1.0 micron. The array of reflection electrodes 31 and the exposed surface of the inter-layered insulating layer 71 are covered with the orientation layer 34. The other substrate structure 20 is fabricated as similar to that of the first embodiment. The substrate structures 10 and 20 are assembled together, and liquid crystal is sealed in the gap between the substrate structures 10 and 20.

The reflection electrodes 31 has the smooth surface morphology with the average pitches equal to or less than 1.0 micron, and achieve the large reflectivity to 200 nanometer wavelength light component to 400 nanometer wavelength component. The large reflectivity to these light components is effective against the yellowish image-forming plane.

Since the reflective material is grown under the conditions same as those in the first embodiment, the smooth surface morphology is achieved. Moreover, the proto-bumps are formed in the inter-layered insulating layer 71 through the simple sequence, and the production cost is reduced.

The half-tone mask may be replaced with a set of photo masks. In this instance, the latent image for the region 72b to be partially etched is produced by using one of the photo masks, and the latent image for the region 72c to be completely etched is produced by using the other photo mask. Otherwise, the patent image may be produced by using another kind of half-tone mask, which has an extremely fine pattern, which exceeds the resolution limit of the exposure light, and the light passing through the extremely fine pattern produces the latent image for the region to be partially etched.

Third Embodiment

Figure 9:
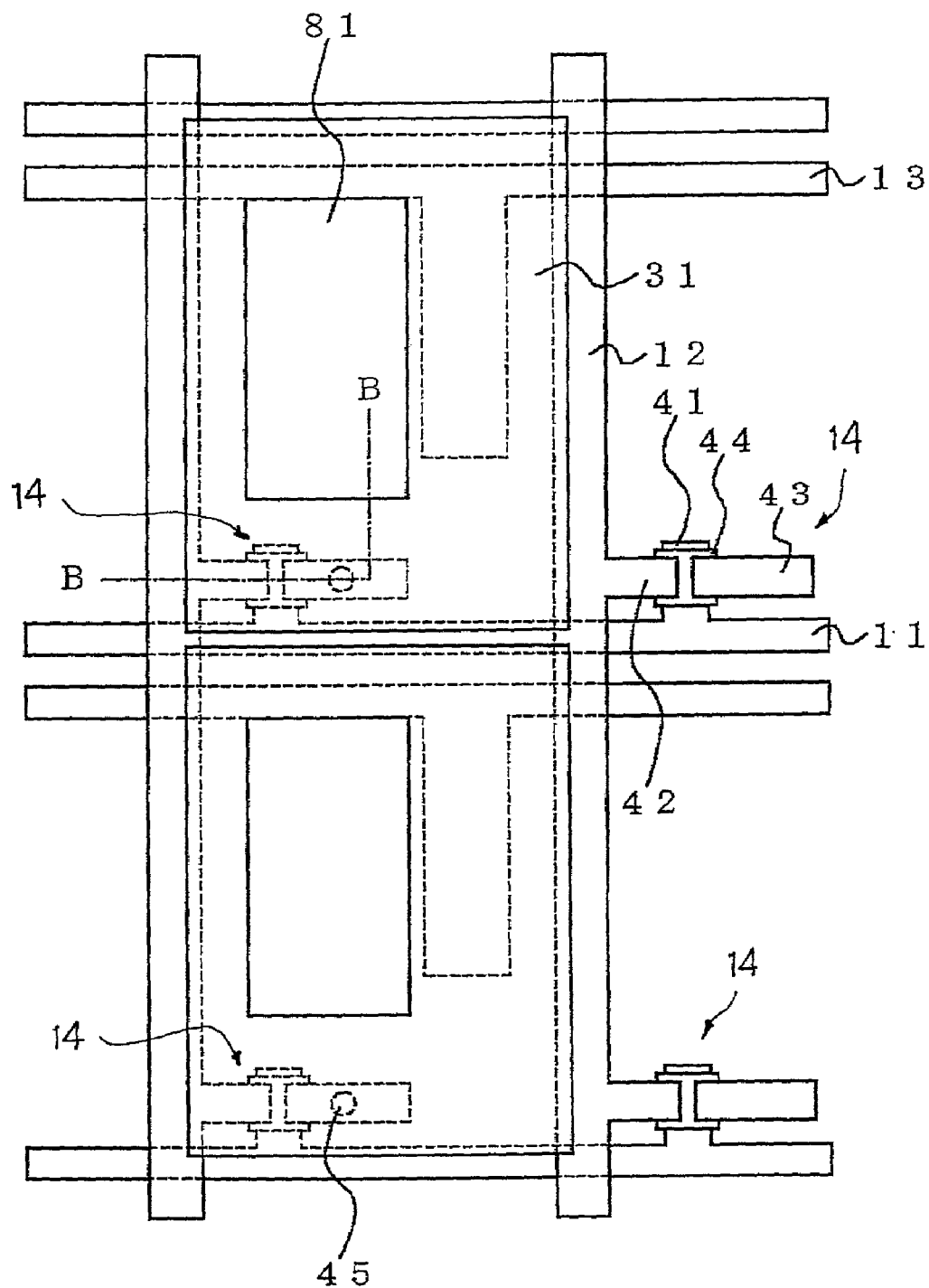
FIG. 9 is a plane view showing the arrangement of components of pixels incorporated in yet another liquid crystal display panel according to the present invention.

Turning to FIG. 9 of the drawings, some pixels occupy the periphery of the central area assigned to an array of color pixels incorporated in yet another liquid crystal display panel embodying the present invention. The liquid crystal display panel implementing the third embodiment is categorized in the reflective-transparent liquid crystal display panel. An inverted staggered type thin film transistor 14, a reflection electrode 31, a counter electrode 33 (see FIG. 10K), a transparent pixel electrode 81, a color filter 21 (see FIG. 10K) and a piece of liquid crystal form in combination a pixel, and a pixel with the red filter, pixel with the green filter and a pixel with the blue filter as a whole constitute a color pixel as similar to that of the first embodiment.

Conductive strips 11 for a scanning signal are arranged in parallel on a transparent insulating substrate 10a, and are respectively connected to the gate electrodes 41 of the thin film transistors 14 in the associated rows. Conductive strips 13 for the common voltage are arranged in parallel to the conductive strips 11, and are alternated with the conductive strips 11. The conductive strips 13 have wide portions at intervals. Conductive strips 12 for a data signal extend in a direction perpendicular to the conductive strips 11/13, and are connected to the drain electrodes 42 of the thin film transistors 14 in the associated columns. Thus, the conductive strips 11 and the conductive strips 12 are arranged over the transparent insulating substrate 10a like a lattice, and define rectangular regions, which are respectively assigned to the pixels. The thin film transistor 14 and the wide portion occupy the associated rectangular region, and are overlapped with the associated reflection electrode 31 and the transparent pixel electrode 81. The reflection electrode 31 is connected to the source electrode 43 of the associated thin film transistor 14, and is electrically connected to the transparent pixel electrode 81. The transparent pixel electrode 81 is surrounded by the associated reflection electrode 31, and the outer periphery of the transparent pixel electrode 81 is held in contact with the inner periphery of the reflection electrode 31. Thus, the conductive strip 12 for the data signal is electrically connectable through the thin film transistor 14, i.e., the drain electrode 42, active layer 44 and the source electrode 43 to the reflection/transparent pixel electrodes 31/81, and a piece of data information representative of a part of image to be produced is written into the reflection/transparent pixel electrodes 31/81.

An inter-layered insulating layer 54/51/52 intervenes between the array of thin film transistors 14 and the reflection/transparent pixel electrodes 31/81 so that holding capacitors are provided in associated with the thin film transistors 14, respectively. Proto-bumps are formed in the inter-layered insulating layer 54/51/52, and are transferred to the reflection electrodes 31. The reflective substance is deposited under predetermined conditions so that the reflection electrodes 31 have smooth surface morphology. The surface morphology is featured by the ruggedness at average intervals equal to or less than 1.0 micron.

Description is hereinbelow made on a process for fabricating the liquid crystal display panel with reference to FIGS. 10A to 10K and FIGS. 7A to 7E. FIGS. 10A to 10K shows the cross section taken along line B—B of FIG. 9. The process sequence of the third embodiment is similar to that of the first embodiment except the step for forming the transparent pixel electrode 81. The process sequence implementing the third embodiment comprises the steps of (1) patterning a meal layer into the gate electrodes 41, metal layers 61 and the conductive strips 11/13, (2) patterning undoped/n+ amorphous silicon layers on the gate insulating layer 53 into the active strips 44, (3) patterning a metal layer into the source/drain electrodes 42/43 and the conductive strips 12, (4) patterning an insulating layer on the passivation layer 54 into proto-bumps, (5) covering the proto-bumps with another insulating layer, (6) forming source contact holes 45 in the passivation layer 54, (7) patterning a transparent conductive layer into the terminal connecting electrodes 63 and the transparent pixel electrode 81 and (8) patterning a reflective metal layer into the reflection electrodes 31.

Figure 10A:
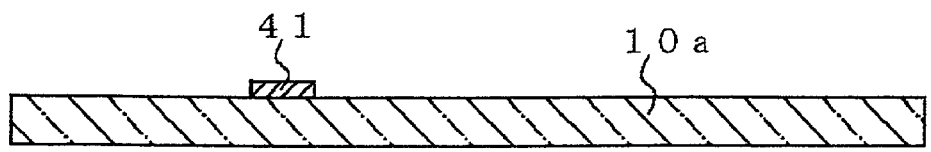
FIGS. 10A to 10K are cross sectional views showing a process sequence for fabricating the liquid crystal display panel.
Figure 10B:
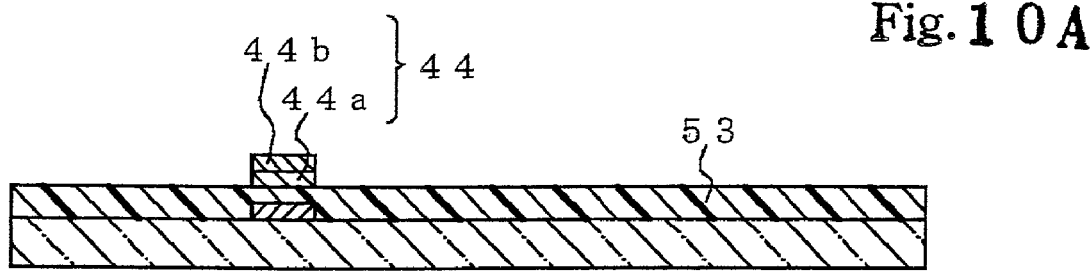
Figure 10C:
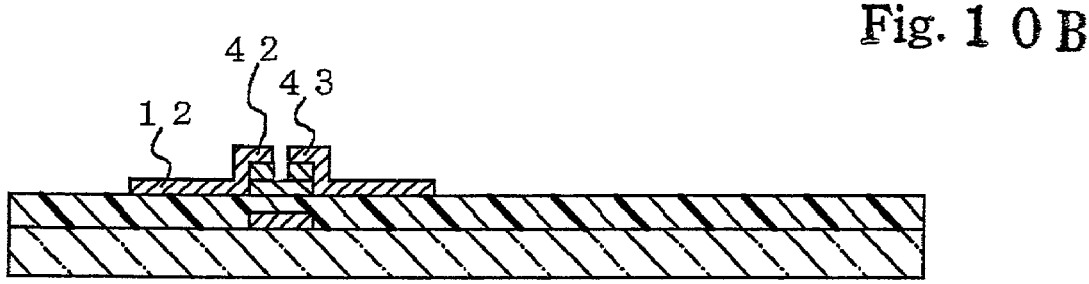
Figure 10D:
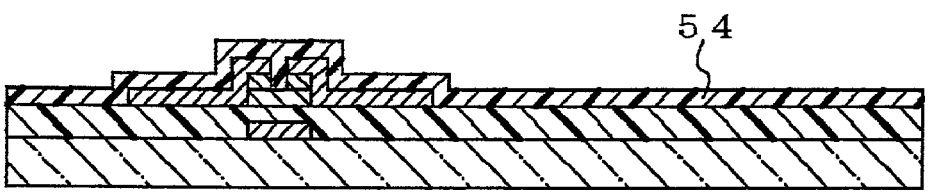
Figure 10E:
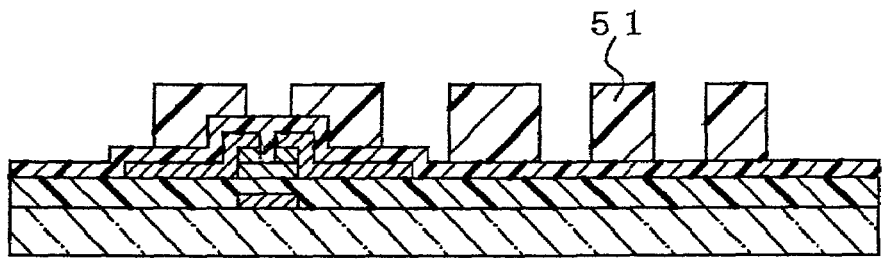

The transparent insulating substrate 10a is prepared, and a chromium layer is patterned into the gate electrodes 41, conductive strips 11 for the scanning signal and the conductive strips 13 for the common voltage as shown in FIG. 10A. The gate electrodes 41 and the conductive strips 11/13 are covered with the gate insulating layer 53, and the undoped amorphous silicon layer 44a and the heavily doped n-type amorphous silicon layer 44b are deposited over the gate insulating layer 53. The undoped/n+ amorphous silicon layers 44a/44b are patterned into the active layer 44 as shown in FIG. 10B. A chromium layer is deposited over the entire surface of the resultant structure, and is patterned into the drain/source electrodes 42/43 and the conductive strips 12. Both end portions of each active layer 44 is covered with the source and drain electrodes 43 and 42, and the n+ amorphous silicon layer 44b is partially etched away by using the drain/source electrodes 42/43 as an etching mask as shown in FIG. 10C. Thus, the array of thin film transistors 14 are formed on the transparent insulating substrate 10a. The array of thin film transistors 14 is covered with the passivation layer 54. However, the source contact holes 45 are not formed in the passivation layer 54. Thus, the process sequence is similar to that of the first embodiment until the formation of the source contact holes 45 in the passivation layer 54.

Figure 10F:
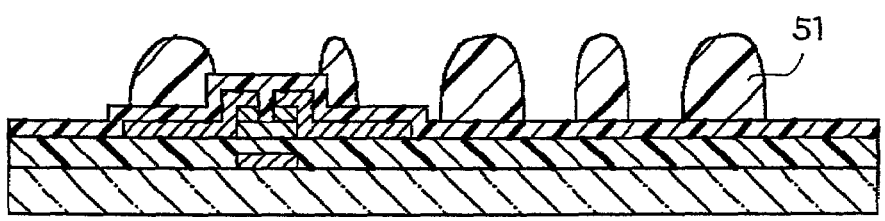
Figure 10G:
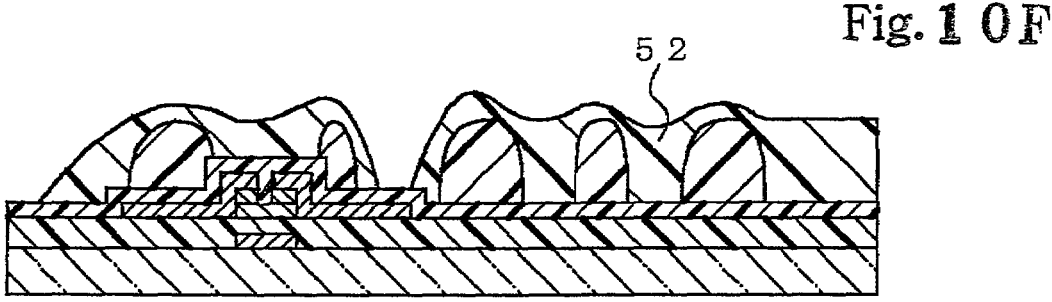
Figure 10H:
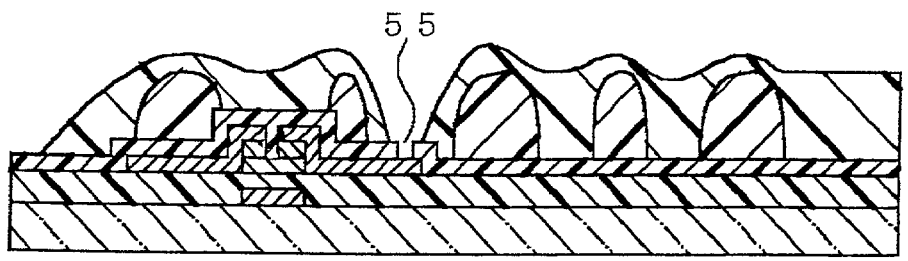

The insulating layer 51 is patterned into bumps (see FIG. 10E), and the surface portions of the bumps are reflowed so as to be made gentle. The proto-bumps are formed in the insulating layer 51 as shown in FIG. 10F. The proto-bumps are covered with the insulating layer 52 as shown in FIG. 10G. Thus, the steps (4) and (5) are corresponding to the steps (6) and (7) of the process implementing the first embodiment. A difference is exposure to light without any mask after the latent images in the insulating layers 51/52 are developed. The exposure to light is effective against coloring. Since the liquid crystal display panel is of the reflective-transparent type, the anti-coloring treatment is preferable.

The gate insulating layer 53 and/or passivation layer 54 are selectively etched away so as to form the source contact holes 55 and the terminal contact holes 62 (see FIGS. 10H and 7D), and the source electrodes 43 and the metal layers 61 are exposed to the source contact holes 55 and the terminal contact holes 62. Contact holes are concurrently formed in the gate insulating layer 53 and the passivation layer 54, and end portions of the conductive strips 13, the metal layers 61 for the terminals 16 and end portions of the conductive strips 12 close to the terminals 12 are exposed to the contact holes, respectively.

Figure 10I:
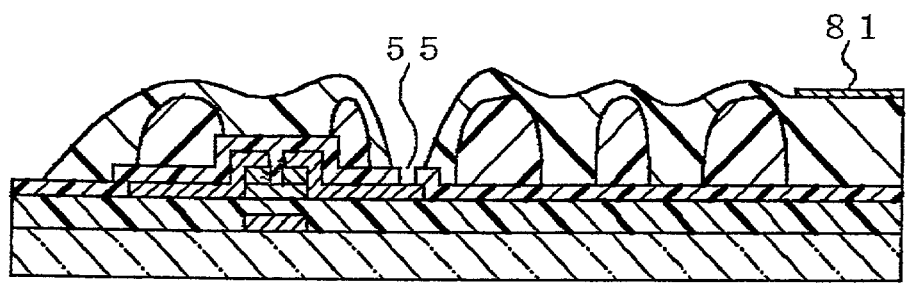

Subsequently, indium-tin-oxide is deposited to 40 nanometers thick to 100 nanometers thick over the resultant structure by using the sputtering. The indium-tin-oxide layer is patterned into the transparent pixel electrodes 81, connecting electrodes 63 for the terminals 15/16/18, the common connecting strips 17 and interconnection between the terminals 16 and the conductive strips 12. The growth of the indium-tin-oxide is carried out as similar to the growth of the reflecting substance for the reflection electrodes 31 so as to prevent the transparent pixel electrodes 81 from the outgassing. Since, the indium-tin-oxide layer is removed from the contact holes 55, the source electrodes 43 are still exposed to the source contact holes 55. The resultant structure is shown in FIGS. 10I and 7E.

Figure 10J:
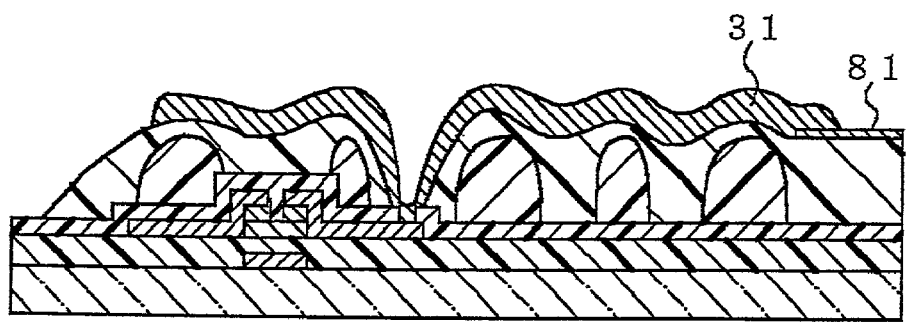

Subsequently, molybdenum and aluminum-neodymium are successively deposited to 50 nanometers thick to 200 nanometers thick and 100 nanometers thick to 300 nanometers thick over the entire surface of the resultant structure by using the sputtering, and the molybdenum layer and the aluminum-neodymium layer are patterned into the reflection electrodes 31 as shown in FIG. 10J. Namely, the molybdenum layer and the aluminum-neodymium layer are removed from narrow areas along the conductive strips 11 and 12 and from the peripheral area assigned to the terminals. Thus, the reflection electrodes 31 are electrically isolated from one another. The reflection electrodes 31 are held in contact with the source electrodes 43 of the associated thin film transistors 14 through the source contact holes 55, respectively. The inner periphery of each of the reflection electrodes 31 is held in contact with the outer periphery of the associated transparent pixel electrode 81. The molybdenum layer intervenes between the transparent pixel electrodes 81 and the aluminum-neodymium layer, and the photo resist etching mask is left over the outer peripheries of the transparent pixel electrodes 81. Although the aluminum-neodymium layer and the molybdenum layer are patterned by using etchant, the photo resist etching mask does not allow the etchant to penetrate into the gap between the transparent pixel electrodes 81 and the molybdenum layer. Any battery is not produced between the transparent pixel electrodes 81 and the aluminum-neodymium layer. The transparent pixel electrodes 81 are not damaged, and never peels off from the insulating layer 52.

Figure 10K:
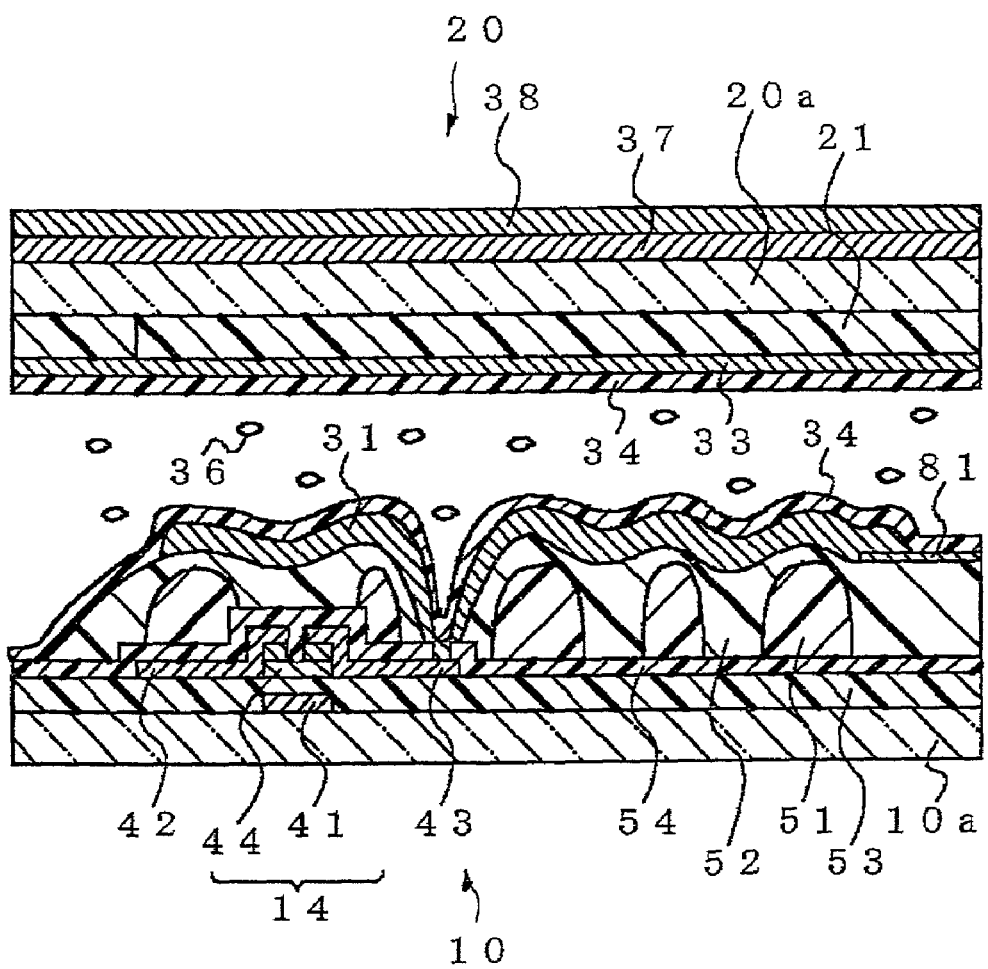

The orientation layer 34 is formed on the array of the reflection electrodes 31 and the exposed surface of the insulating layer 52, and the substrate structure 10 is completed. The other substrate structure 20 is prepared separately from the substrate structure 10. The substrate structures 10 is aligned with the other substrate structure 20 as shown in FIG. 10K, and the liquid crystal is sealed in the gap between the substrate structures 10 and 20.

The sputtering is carried out under the conditions same as those of the first embodiment, and the smooth morphology is achieved on the upper surfaces of the reflection electrodes 31. The ruggedness on the upper surface is represented by the average pitches equal to or less than 1 micron. The reflectivity to 200 nanometer wavelength light component to 400 nanometer wavelength light component is equal to or greater than 90% of the reflectivity to the visual light components. Thus, the reflection electrodes 31 are effective against the yellowish image-forming plane.

Fourth Embodiment

Figure 11:
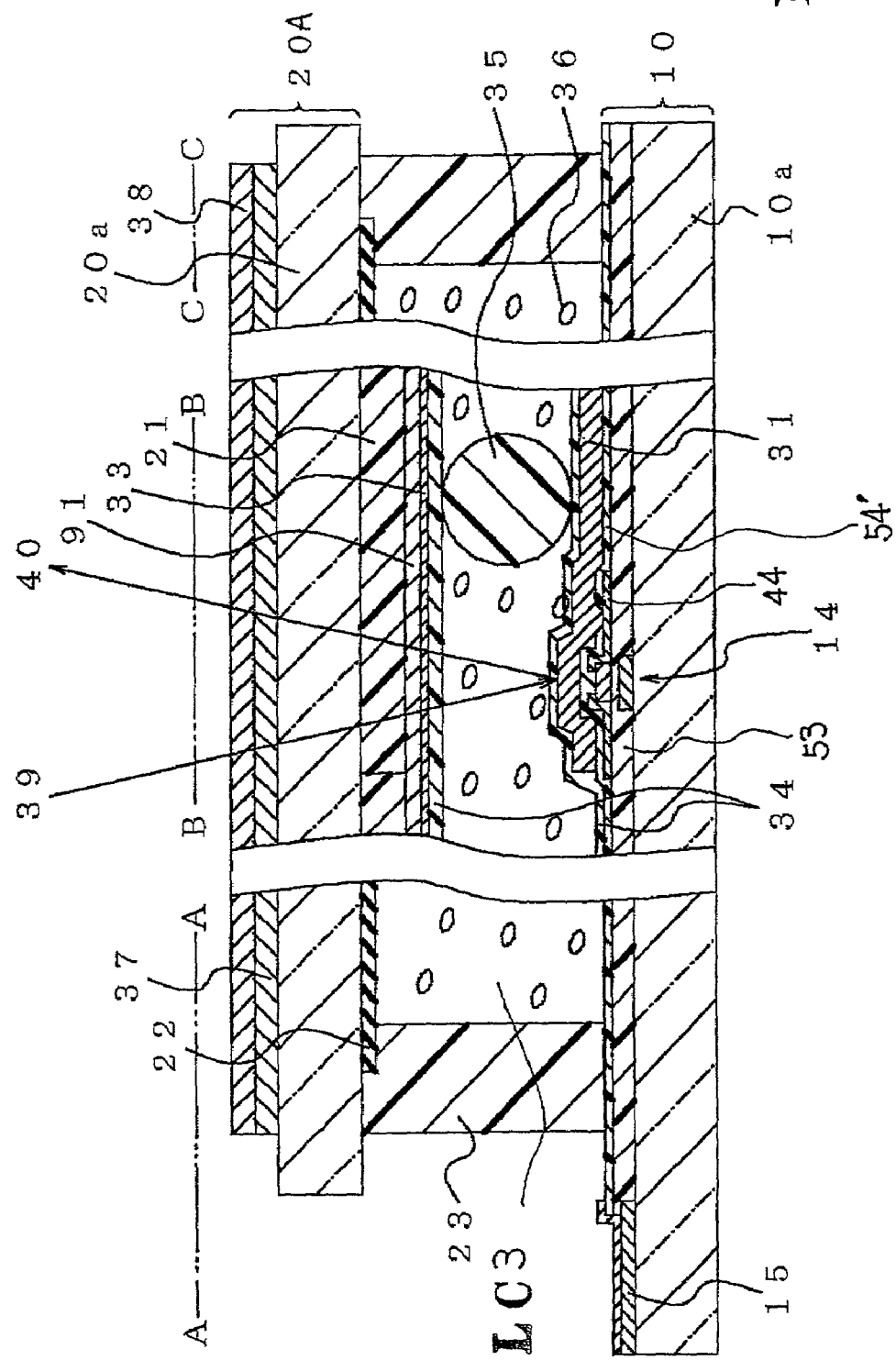
FIG. 11 is a cross sectional view showing the structure of still another liquid crystal display panel according to the present invention.

Turning to FIG. 11 of the drawings, still another liquid crystal display panel embodying the present invention largely comprises two substrate structures 10 and 20A, a sealing layer 23, spherical spacers 35 and liquid crystal LC3 filling the gap between the substrate structures 10 and 20A. Dots-and-dash lines A—A, B—B and C—C are indicative of cross sections corresponding to the cross sections taken along dot-and-dash line A—A of FIG. 4, dot-and-dash line B—B of FIG. 5 and dot-and-dash line C—C of FIG. 4, respectively.

The substrate structure 10 is similar to that of the first embodiment. However, the other substrate structure 20A is different from that of the first embodiment. An irregular reflection plate is inserted between the color filters 21 and the counter electrode 33. Accordingly, an inter-layered insulating layer 31A is not rugged, and the reflection electrode 31 is patterned directly on the passivation layer 54'.

The liquid crystal display panel implementing the fourth embodiment is fabricated through the process sequence. The fabrication process comprises the steps of (1) patterning a metal layer into the conductive strips 11/13 and the gate electrodes 41, (2) patterning undoped/n+ amorphous silicon layers on the gate insulating layer 53 into the active layers 44, (3) patterning a metal layer into the drain/source electrodes 42/43 and the conductive strips 12, (4) covering the drain/source electrodes 42/43 and the conductive strips 12 with the passivation layer 54, (5) patterning a transparent conductive layer into the terminal connecting electrodes 63 and (6) patterning a metal layer into the reflecting electrodes 31. Thus, the fabrication process implementing the fourth embodiment does not include the steps (6) and (7) of the fabrication process for fabricating the liquid crystal display panel implementing the first embodiment.

In the process sequence, the passivation layer 54' is not spread over the array of thin film transistors 14. The passivation layer 54' is formed of silicon nitride, and the silicon nitride is deposited by using a plasma-assisted chemical vapor deposition. When the source/terminal contact holes are formed in the passivation layer 54' as similar to those shown in FIGS. 6D and 7D, the resultant structure is conveyed into a heating chamber, and keeps it at room temperature or is heated to 170 degrees in centigrade or less. Thereafter, the resultant structure is conveyed to a sputtering chamber. The sputtering chamber is either identical with or different from the heating chamber. In the sputtering chamber, molybdenum and aluminum-neodymium are successively deposited over the resultant structure. This is because of the fact that the out-gassing from the passivation layer 54' is negligible. The aluminum-neodymium layer is not cloudy, and exhibits a high reflectivity. It is preferable that the passivation layer 54' is thicker than the passivation layer 54. The passivation layer 54' ranges from 300 nanometers thick to 800 nanometers thick. If the array of thin film transistors 14 is covered with the passivation layer 54, which is spread over the array of thin film transistors 14 and, thereafter, baked, instead of the passivation layer 54'. Only the step for forming the proto-bumps is eliminated from the process sequence, and the step for pattering the metal/alloy layers into the reflection electrodes 31 is similar to the step incorporated in the process for the first embodiment. Thus, the elimination of the influence of the out-gassing is still required for the reflection electrodes 31, and is less desirable.

However, the reflection electrodes 31 are to be formed under the conditions same as those in the first embodiment. The neodymium content of the aluminum-neodymium alloy is to be fallen into the range between 0.5 weight % and 10 weight %, and the aluminum-neodymium alloy is grown at the substrate temperature equal to or less than 170 degrees in centigrade. The surface morphology at the average pitches equal to or less than 1 micron is created on the upper surfaces of the reflection electrodes 31. As a result, the reflection electrodes 31 exhibit the reflectivity to 200 nm wavelength light component–400 nm wavelength light component equal to or greater than 90% of the reflectivity to the visible light components, and the are prevented from the hillocks in the baking step for forming the orientation layer 34. Thus, the reflection electrodes 31 do not make the image-forming plane yellowed regardless of the substance used for the orientation layer 34. Moreover, the contact resistance between the source electrodes 43 and the reflection electrodes 31 is not increased so that the pieces of data information are surely written into the pixels.

On the other hand, the other substrate structure 20A includes the irregular reflection plate 91, and the fabrication process is different from that described in conjunction with the first embodiment. The irregular reflection plate 91 is formed of particle-dispersed novolak resin. The particles are, by way of example, beads formed of synthetic resin, and are dispersed in the novolak resin. The size of the beads and blending ratio are optimized so that the irregular reflection plate 91 achieves light-scattering characteristics same as those of the reflection electrodes 31 formed with the bumps. The liquid crystal display panel embodying the present invention achieves the high reflectivity, free from the yellowish image-forming plane and failure in writing the pieces of data information into the pixels.

Reason for Limitations

Figure 12:
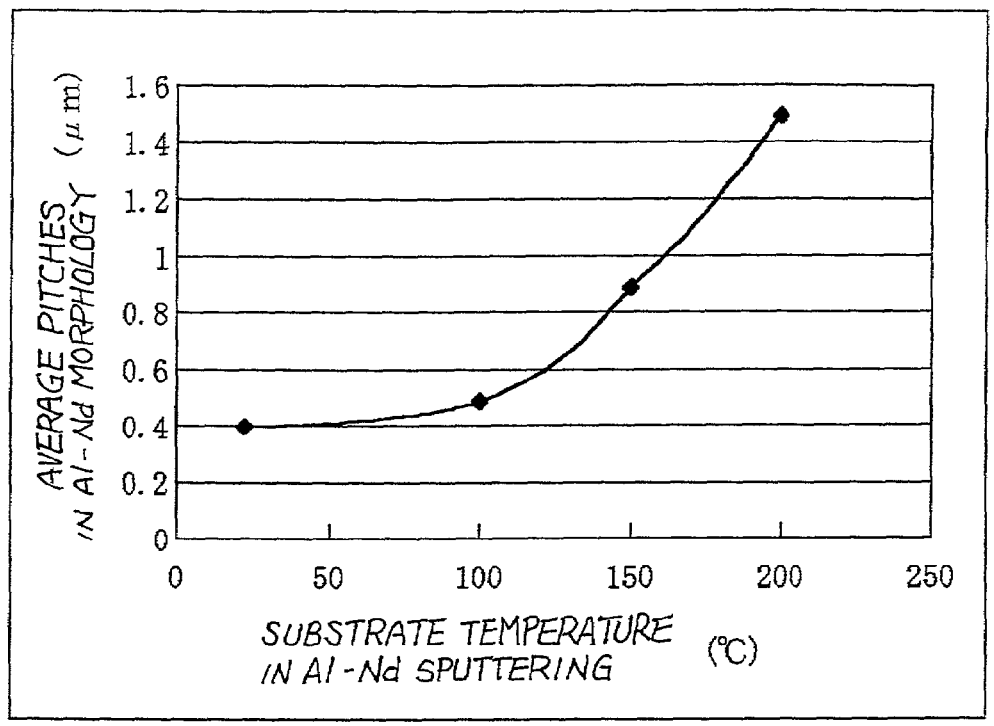
FIG. 12 is a graph showing a relation between the substrate temperature in a sputtering and average pitches.

The present inventors investigated the optimum surface morphology and the sputtering conditions as follows. First, the present inventors sputtered aluminum-neodymium alloy on glass substrates at different values of the substrate temperature. The aluminum-neodymium alloy contained the neodymium at 4.5 weight %. The present inventors observed the surface morphology through a scanning electron beam microscopy at magnification ratio of fifth thousands, and took pictures of the surface morphology of the samples in a certain oblique direction. The present inventors measured the average pitches of the ruggedness, and the average pitches were plotted in FIG. 12. The present inventors found that the ruggedness became smooth when the substrate temperature was lowered. When the substrate temperature was 200 degrees in centigrade, the average pitches were 1.5 microns. The substrate temperature was decreased to 150 degrees in centigrade, then the average pitches were of the order of 0.9 micron. When the sputtering was carried out at the substrate temperature equal to or less than 100 degrees in centigrade, the average pitches were equal to or less than 0.5 micron. The depth of ruggedness was reduced together with the substrate temperature. When the substrate temperature was 200 degrees in centigrade, the depth was of the order of 0.5 micron. The substrate temperature was reduced to 150 degrees in centigrade, then the depth was reduced to about 0.3 micron. When the sputtering was carried out at the substrate temperature equal to or less than 100 degrees in centigrade, the depth was decreased to 0.2–0.1 micron.

Figure 13:
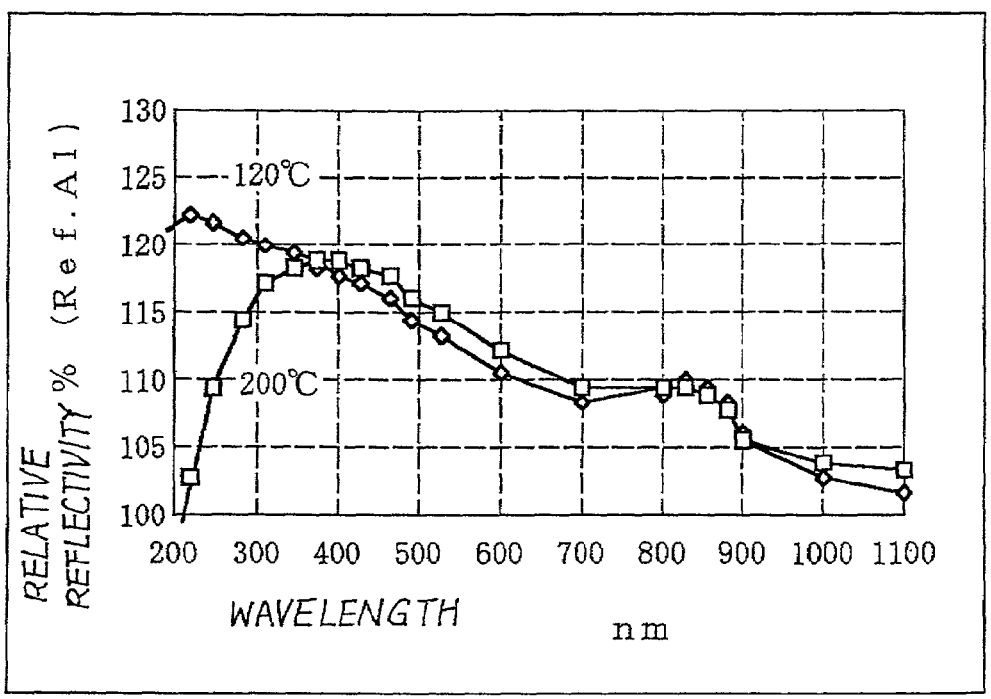
FIG. 13 is a graph showing a relative reflectivity to light components.

Subsequently, the present inventors measured the reflectivity of the aluminum-neodymium layers to light components. The reflectivity was normalized with respect to the reflectivity on an aluminum layer. In other words, the reflectivity on the aluminum layer was to be plotted at 100%. The relative reflectivity was plotted in FIG. 13.

When the aluminum-neodymium alloy was sputtered at 200 degrees in centigrade, the average pitches were of the order of 1.5 microns (see FIG. 12), and the relative reflectivity was peaked around 400 nm wavelength light component, and the relative reflectivity was reduced on both sides of the peak. On the other hand, when the aluminum-neodymium was sputtered at 120 degrees in centigrade, the average pitches were of the order of 0.7 micron, and the relative reflectivity was not reduced below the 400 nm wavelength light component. The relative reflectivity on the aluminum-neodymium alloy exhibited the same tendency as that on the aluminum-neodymium alloy at the average pitches of 1.5 micron. However, the relative reflectivity on the aluminum-neodymium alloy at the average pitches of 0.7 micron was increased even when the wavelength was decreased from the 400 nanometers. The present inventors confirmed that the aluminum-neodymium alloy layers at the average pitches equal to or less than 1.0 micron did not reduce the relative reflectivity to the light components equal to or less than 400 nanometers. The present inventors concluded that the surface morphology at the average pitches equal to or less than 1.0 micron was effective against the yellowish image-forming plane.

Figure 14:
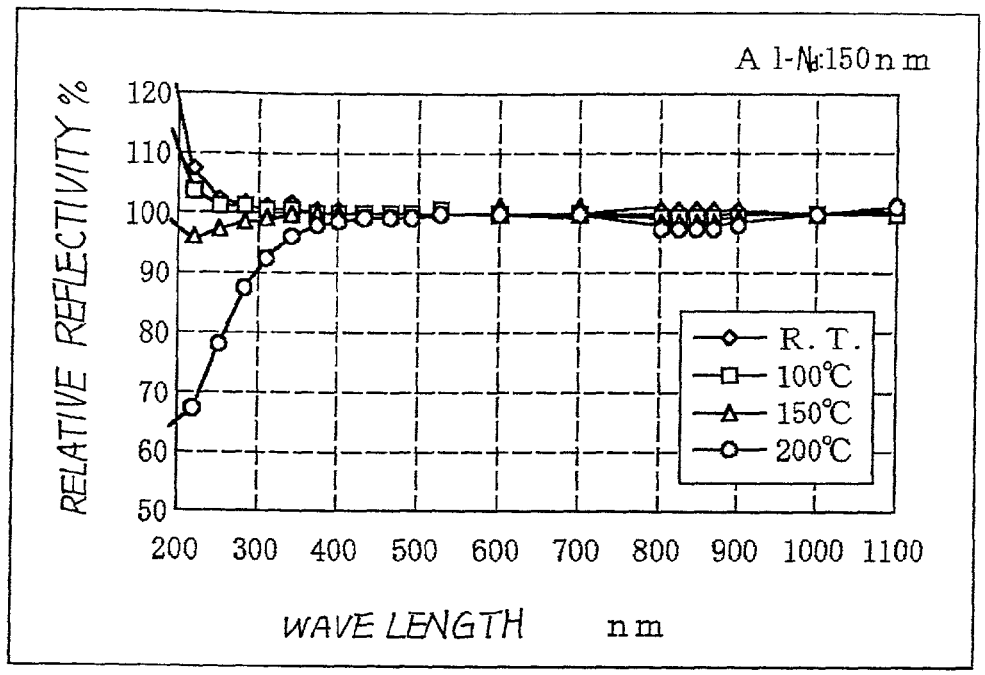
FIG. 14 is a graph showing a relative reflectivity on aluminum-neodymium alloy layers of 150 nanometers thick to light components.
Figure 15:
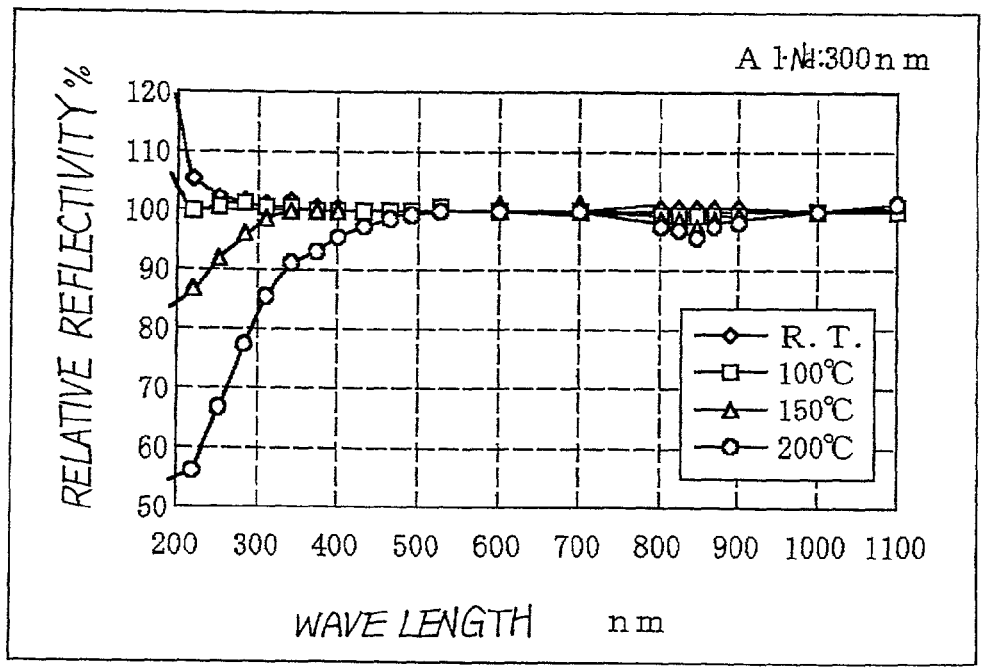
FIG. 15 is a graph showing a relative reflectivity on aluminum-neodymium alloy layers of 300 nanometers thick to light components.

Subsequently, the present inventors investigated the influences of the thickness on the reflectivity. The present inventors sputtered aluminum-neodymium alloy to various values of thickness at different values of the substrate temperature. The present inventors measured the reflectivity on the aluminum-neodymium layers, and normalizes the reflectivity with respect to the reflectivity represented by the plots at 120 degrees in centigrade in FIG. 13. In other words, the reflectivity on the aluminum-neodymium alloy layer sputtered at 120 degrees in centigrade was to be plotted at 100%. The normalized or relative reflectivity on the aluminum-neodymium alloy layer of 150 nanometers thick was plotted in FIG. 14. Similarly, the relative reflectivity on the aluminum-neodymium layer of 300 nanometers thick was plotted in FIG. 15. In FIGS. 14 and 15, "RT" stands for "room temperature".

Comparing the plots in FIG. 14 with the plots in FIG. 15, it was understood that the relative reflectivity to the ultraviolet light components was reduced when the aluminum-neodymium alloy layer was increased in thickness. For example, the aluminum-neodymium alloy layers sputtered at 100 degrees in centigrade exhibited the relative reflectivity still increased to the ultraviolet light components at 150 nanometer thick. However, when the thickness was increased to 300 nanometers thick, the aluminum-neodymium alloy layers sputtered at 100 degrees in centigrade exhibited the relative reflectivity same in tendency as the reference sample, i.e., the aluminum-neodymium alloy layer deposited at 120 degrees in centigrade. The aluminum-neodymium alloy layers sputtered at 200 degrees in centigrade exhibited miserable reflectivity to the ultraviolet light components regardless of the thickness.

Subsequently, the inventors investigated the transparency of organic compounds used for the orientation layer 34 to light components. Orientation layer "A" was manufactured by Nissan Chemical Corporation ltd., and Orientation layer "B" was manufactured by JSR. The composition was different between the orientation layer "A" and the orientation layer "B". Although both orientation layers "A" and "B" contained polyimide, the composition was different. The organic compound for the orientation layer "A" exhibited the transparency fallen within the range almost between 97% and 99%. However, the organic compound for the orientation layer "B" exhibited the transparency gradually decreased together with the wavelength. When the orientation layer "B" was used in the liquid crystal display panel, the image-forming plane became yellowish. However, the reflection electrodes according to the present invention were employed in the liquid crystal display panel, the image-forming plane was prevented from being yellowed.

Figures 16, 17, 18:
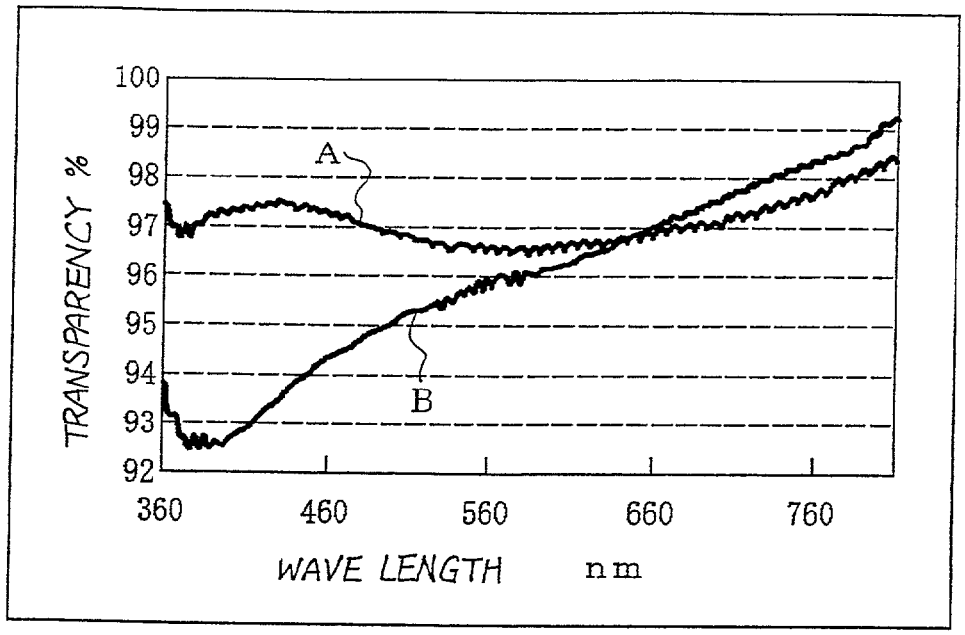
FIG. 16 is a graph showing a relation between transparency and light components measured in different organic compounds.
FIG. 17 is a view showing a relation between neodymium content and hillocks/reflectivity.
FIG. 18 is a view showing a relation between the substrate temperature, color on an image-forming plane, reflectivity and contact resistance.

The present inventors further investigated the influences of the neodymium content on hillocks and reflectivity. The present inventors sputtered aluminum-neodymium alloy different in neodymium content, and the aluminum-neodymium alloy layers were treated with heat at 230 degrees in centigrade for an hour. The conditions of the heat treatment were similar to those in the baking step for the orientation layer 34. After the heat treatment, the present inventors observed the aluminum-neodymium layers through an optical microscope to see whether or not hillocks took place on the aluminum-neodymium layers. The observation was summarized in FIG. 17. When the neodymium content was less than 0.5 weight %, i.e., 0.1 weight %, the hillocks were observed, and the sample was marked with "x". The samples between 0.1 weight % and 5 weight % exhibited the reflectivity as large as that on a pure aluminum layer deposited at room temperature, and were marked with "○". The reflectivity to 400 nm wavelength light component on the sample at 10 weight % was reduced at 6–8%, and the sample was marked with "Δ". However, the reflectivity to 400 nm wavelength light component on the sample at 20 weight % was reduced more than 10%, and the sample was marked with "x". Thus, the present inventors concluded that the neodymium content was to be fallen within the range between 0.5 weight % to 10 weight %.

Finally, the present inventors evaluated the samples from three viewpoints, i.e., color on the image-forming plane, reflectivity and contact resistance between the source electrode 43 and the reflection electrode 31. The results were summarized in FIG. 18. The samples were respectively formed with aluminum-neodymium layers on organic compound layers, and the aluminum-neodymium contained the neodymium at 4.5 weight %. The aluminum-neodymium layers were covered with orientation layers "B". However, the aluminum-neodymium layers were deposited at different values of the substrate temperature. The image-forming plane was yellowed in the sample with the aluminum-neodymium layer deposited at 200 degrees in centigrade, and was marked with "x". The reflectivity to 400 nm wavelength light component was reduced at 1–5% in the samples with the aluminum-neodymium layers deposited at 170 degrees in centigrade and 200 degrees in centigrade. For this reason, the samples were marked with "Δ". Although the aluminum-neodymium layer deposited at 20 degrees in centigrade exhibited goo reflectively on a glass substrate, the aluminum-neodymium layer became cloudy due to the out-gassing from the organic compound layer, and the reflectively to 400 nm wavelength light component was reduced at 5%. For this reason, the sample was marked with "Δ". The samples exhibited low contact resistance in so far as the substrate temperature was equal to or greater than 70 degrees in centigrade. However, when the aluminum-neodymium alloy was deposited at room temperature, i.e., 20 degrees in centigrade, the constant resistance was increased due to the out-gassing. For this reason, the sample was marked with "x". The present inventors concluded that the aluminum-neodymium was to be deposited on an insulating layer grown through the plasma-assisted chemical vapor deposition such as, for example, silicon nitride by using the sputtering at the substrate temperature equal to or less than 170 degrees in centigrade. On the other hand, when the insulating layer was formed of the resin spread and baked, the aluminum-neodymium alloy was deposited by using the sputtering at the substrate temperature between 70 degrees in centigrade and 170 degrees in centigrade.

The present inventors investigated other samples, which have the reflection electrodes 31 formed of a substance larger in reflectivity than aluminum. Examples of the substance were silver and silver alloys. The samples exhibited the reflectivity, property against hillocks and contact resistance similar to those of the aluminum-neodymium alloy.

Even if the orientation layer is formed of organic compound, which exhibits the wavelength dependency like the organic compound for the orientation layer "B", the reflection electrodes according to the present invention prevent the image-forming plane from being yellowed, achieve a high reflectivity, and are held in contact with the source electrodes 43 at a low contact resistance. The reflection electrodes according to the present invention have the surface morphology represented by the average pitches equal to or less than 1 micron. It is more preferable that the average pitches were equal to or less than 0.6 micron. It is also more preferable that the reflection electrodes 31 exhibit the reflectivity to 200 nm wavelength light component to 400 nm wavelength light component greater than 95% of the reflectivity to the visible light (see FIGS. 14 and 15). In other words, it is necessary to control the process parameters in such a manner that the reflection electrodes have the above-described surface morphology and reflectivity.

It is also preferable that the aluminum-neodymium contains the neodymium fallen within the range from 0.5 weight % to 10 weight %. It is more preferable that the neodymium content ranges from 0.5 weight % to 5 weight %, because the aluminum-neodymium layers exhibit large reflectivity without hillocks (see FIG. 17). The hillocks are undesirable, because the rubbing rollers are contaminated.

If the orientation layer 34 is formed of organic compound having the transparency to 300 nm wavelength light component to 600 nm wavelength light component equal to or greater than 95% such as, for example, orientation layer "A" (see FIG. 16), the image-forming plane is less liable to be yellowed.

Although particular embodiments of the present invention have been shown and described, it will be apparent to those skilled in the art that various changes and modifications may be made without departing from the spirit and scope of the present invention.

For example, the inverted staggered channel-etched thin film transistors 14 may be replaced with another kind of transistors such as channel-protected thin film transistors, non-inverted staggered type thin film transistors or coplanar type thin film transistors. The thin film transistors may have active layers formed of polysilicon.

Moreover, the thin film transistors may be replaced with the MIM (Metal-Insulator-Metal) diodes. The transparent insulating substrates 10a/20a may be formed of plastic, ceramic or semiconductor. However, the semiconductor substrate may not be used for the reflection-transparent liquid crystal display panel.

The present invention may be applied to STN (Super-Twisted-Nematic) liquid crystal display panels. The step for forming the reflection electrodes incorporated in the fourth embodiment is applicable to processes for fabricating reflective liquid crystal display panels or reflective-transparent liquid crystal display panels. These liquid crystal display panels may have glass substrates with rugged surfaces to be transferred to the reflection electrodes.

What is claimed is:

1. A liquid crystal display panel comprising:
   a bus line on a substrate;
   a switching element connected to said bus line;
   a reflecting electrode connected to said switching element; and
   an orientation layer formed on said reflecting electrode, said orientation layer having a transmittance equal to or greater than 95% to light in an entire wavelength region between 300 nanometers and 600 nanometers.

2. A liquid crystal display panel comprising:
   a bus line on a substrate;
   a switching element connected to said bus line; and
   a reflecting electrode connected to said switching element, wherein a reflectance of said reflecting electrode to light in an entire wavelength region between 200 nanometers and 400 nanometers is at least 90% of a reflectance to light with wavelength of 400 nanometers.

* * * * *